(12) United States Patent
Nakatani

(10) Patent No.: US 8,908,250 B2
(45) Date of Patent: Dec. 9, 2014

(54) MEMS MIRROR DEVICE AND METHOD FOR MANUFACTURING THE SAME

(75) Inventor: Goro Nakatani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 441 days.

(21) Appl. No.: 13/439,597

(22) Filed: Apr. 4, 2012

(65) Prior Publication Data

US 2012/0250129 A1 Oct. 4, 2012

(30) Foreign Application Priority Data

Apr. 4, 2011 (JP) .................. 2011-082836

(51) Int. Cl.
*G02B 26/08* (2006.01)
*G02B 26/10* (2006.01)

(52) U.S. Cl.
CPC .......... *G02B 26/0841* (2013.01); *G02B 26/105* (2013.01); *Y10S 359/90* (2013.01)
USPC ...................... 359/199.2; 359/200.6; 359/900

(58) Field of Classification Search
CPC ............. G02B 26/0841; G02B 26/105; G02B 26/085; G02B 26/08; G02B 26/0833; H02N 1/008; H02N 1/006; B81B 2201/04; B81B 2201/042; B81B 2203/0109; B81B 2203/058; B81B 3/0062; B81B 2203/0163; B81B 3/0048

USPC ......................... 359/199.2, 200.6, 224.1, 298
See application file for complete search history.

(56) References Cited

U.S. PATENT DOCUMENTS 7,468,824 B2 * 12/2008 Nakajima .................. 359/224.1
7,550,895 B2 * 6/2009 Tsuboi et al. .................. 310/309

FOREIGN PATENT DOCUMENTS

JP 2005-308820 A 11/2005

* cited by examiner

*Primary Examiner* — James Phan
(74) *Attorney, Agent, or Firm* — Rabin & Berdo, P.C.

(57) ABSTRACT

A MEMS mirror device includes a semiconductor substrate, a mirror provided on the semiconductor substrate, a first cavity, a second cavity, and a frame portion to define the first cavity and the second cavity. The semiconductor substrate further includes a swing portion formed just above the first cavity to support the mirror, a straight beam provided just above the first cavity to extend between the frame portion and the swing portion, a comb-teeth-like fixed electrode, and a comb-teeth-like movable electrode, the movable electrode meshing with the fixed electrode with a gap left therebetween, the swing portion configured to swing about the beam as a swing axis in response to movement of the movable electrode.

15 Claims, 21 Drawing Sheets

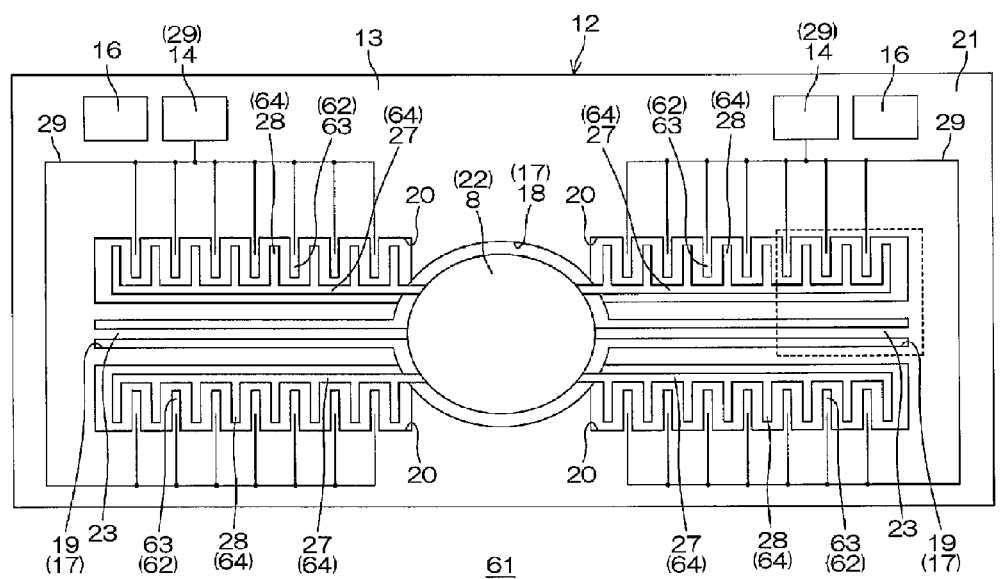

US 8,908,250 B2

MEMS MIRROR DEVICE AND METHOD FOR MANUFACTURING THE SAME

CROSS-REFERENCE TO RELATED APPLICATION

This application is based upon and claims the benefit of priority from Japanese Patent Application No. 2011-82836, filed on Apr. 4, 2011, the entire contents of which are incorporated herein by reference.

TECHNICAL FIELD

The present disclosure relates to a capacitance type micro-electro-mechanical system (MEMS) mirror device that includes a comb-teeth-like fixed electrode and a comb-teeth-like movable electrode meshing with and opposing each other and a mirror swinging in response to displacement of the movable electrode, and a method for manufacturing the MEMS mirror device.

BACKGROUND

There is conventionally known an electrostatically-driven MEMS mirror device for performing laser light switching or laser light scanning For example, there is known an electrostatically-driven MEMS mirror scanner having a configuration in which an upper plate carrying a scanning mirror is layered on a lower plate.

SUMMARY

A MEMS mirror device according to the present disclosure includes: a semiconductor substrate having a first cavity with an open bottom and a second cavity with a closed bottom which are selectively formed to communicate with each other, the semiconductor substrate including a frame portion arranged to define the first cavity and the second cavity at lateral sides of the first cavity and the second cavity; and a mirror provided on the semiconductor substrate, the semiconductor substrate including: a swing portion formed just above the first cavity in a spaced-apart relationship with the frame portion to support the mirror from below; a straight beam provided just above the first cavity to extend between the frame portion and the swing portion, the beam arranged to support the swing portion at a lateral side of the swing portion such that the swing portion is kept floating in the first cavity; a comb-teeth-like fixed electrode arranged just above the second cavity and fixed to the frame portion; and a comb-teeth-like movable electrode formed to extend over the first cavity and the second cavity, the movable electrode connected to the swing portion just above the first cavity, the movable electrode meshing with the fixed electrode just above the second cavity with a gap left between the movable electrode and the fixed electrode, the swing portion configured to swing about the beam as a swing axis in response to movement of the movable electrode.

The MEMS mirror device of the present disclosure can be manufactured by, e.g., a method for manufacturing a MEMS mirror device according to the present disclosure. More specifically, the method includes the steps of: preparing a semiconductor substrate, selectively forming a first cavity opened at the side of a rear surface of the semiconductor substrate by selectively etching the rear surface of the semiconductor substrate, forming a surface layer portion of the semiconductor substrate at the side of a front surface of the semiconductor substrate with respect to the first cavity and forming a frame portion configured to define the first cavity at a lateral side of the first cavity; forming a stopper insulation film on a rear surface of the surface layer portion of the semiconductor substrate; forming a mirror on a front surface of the surface layer portion of the semiconductor substrate; selectively etching the surface layer portion of the semiconductor substrate from the front surface of the semiconductor substrate to the stopper insulation film and consequently forming a swing portion configured to support the mirror from below, by using the remaining surface layer portion, in a spaced-apart relationship with the frame portion; selectively etching the surface layer portion of the semiconductor substrate from the front surface of the semiconductor substrate to the stopper insulation film and forming a straight beam configured to support the swing portion from a lateral side of the swing portion, by using the remaining surface layer portion, to extend between the frame portion and the swing portion; forming an electrode trench by selectively etching the frame portion from the front surface of the semiconductor substrate to a thickness-wise intermediate portion of the semiconductor substrate and, at the same time, forming a comb-teeth-like fixed electrode and a comb-teeth-like movable electrode meshing with and opposing each other across the electrode trench; forming a second cavity just below the fixed electrode and the movable electrode by isotropic etching in which an etching medium is supplied to the electrode trench, the second cavity continuously extending below the fixed electrode and the movable electrode and leading to the first cavity; and after forming the second cavity, selectively removing a portion of the stopper insulation film protruding out from the swing portion and the beam such that the swing portion and the beam are kept floating just above the first cavity.

According to the method above, the first cavity may be formed by etching the semiconductor substrate from the rear surface thereof to the thickness-wise intermediate portion thereof. Thereafter, the surface layer portion of the semiconductor substrate formed at the side of the front surface with respect to the first cavity may be etched to reach the stopper insulation film and is selectively removed. The swing portion may be formed using the remaining surface layer portion. Thus the swing portion made up of the surface layer portion of the semiconductor substrate is formed and, at the same time, the first cavity is formed as a space for enabling the swing portion (the mirror) to make swing movement The first cavity having a relatively wide area required to enable the swing movement of the mirror can be defined by etching the semiconductor substrate to the thickness-wise intermediate portion thereof. Therefore, unlike the case where a cavity is formed to extend through the lower plate in the thickness direction as in the related art, it is possible to reduce the amount of the etching gas impinging, in the etching process, against the support table of an etching apparatus for supporting the semiconductor substrate.

Similarly, the second cavity for making it possible to drive the movable electrode is formed by etching the semiconductor substrate to the thickness-wise intermediate portion to define the electrode trench and then making continuous the lower portions of the fixed electrode and the movable electrode meshing with each other across the electrode trench, through isotropic etching. Accordingly, when forming the second cavity (the electrode trench), it is equally possible to reduce the amount of the etching gas impinging against the support table of the etching apparatus.

In the present MEMS mirror device manufactured by the present manufacturing method, the frame portion, the fixed electrode, the movable electrode, the beam and the swing portion are all formed by partially processing the semiconductor substrate. Therefore, it is not necessary to use a plurality of substrates to form these component members as in the related art. For that reason, the overall thickness of the device is approximately equal to the thickness of the semiconductor substrate, thereby making it possible to reduce the size of the MEMS mirror device In other words, the present embodiment makes it possible to manufacture a small-sized MEMS mirror device while reducing the burden to the etching apparatus. When defining the swing portion and the beam in the present manufacturing method, the stopper insulation film for restraining the etching gas from flowing into the first cavity may be completely removed after manufacturing the MEMS mirror device or may be left as the rear surface insulation film, e.g., on the rear surface of the swing portion and/or the rear surface of the beam.

In the present manufacturing method, at least two of the steps of forming the swing portion, the step of forming the beam and the step of forming the fixed electrode and the movable electrode may preferably be performed at the same time. This makes it possible to reduce the number of steps and to efficiently manufacture the MEMS mirror device.

The present MEMS mirror device may preferably further include an isolated insulation film embedded into at least one of the fixed electrode and the movable electrode and configured to selectively insulate a portion of at least one of the fixed electrode and the movable electrode from the remaining portion of the semiconductor substrate. This makes it possible to electrically isolate (insulate) the fixed electrode and/or the movable electrode from the remaining portion of the semiconductor substrate. Accordingly, the front surface of the remaining portion of the semiconductor substrate can be efficiently used as a space for forming the wiring lines connected to the fixed electrode and the movable electrode.

The isolated insulation film can be formed by performing the step of, prior to forming the electrode trench, forming an isolating trench in the semiconductor substrate by selectively etching the semiconductor substrate from the front surface thereof and the step of forming the isolated insulation film within the isolating trench by embedding an insulation material into the isolating trench. Then, when forming the electrode trench, the semiconductor substrate may be etched such that a portion of the fixed electrode and the movable electrode is insulated from the remaining portion of the semiconductor substrate by the isolated insulation film.

The present MEMS mirror device may further include a wiring line formed in the same layer as the mirror and configured to apply a voltage to at least one of the fixed electrode and the movable electrode. The term "same layer" refers to the relationship between the layers simultaneously formed in the same step. For example, the wiring line and the mirror can be formed in the same layer by simultaneously performing the step of forming the wiring line of at least one of the fixed electrode and the movable electrode and the step of forming the mirror.

In the present MEMS mirror device, the movable electrode may preferably include a horizontal-type movable electrode configured to alternately displace along a front surface of the semiconductor substrate toward and away from the fixed electrode adjoining to the movable electrode. If a drive voltage of the same polarity or different polarities is alternately applied between the fixed electrode and the horizontal-type movable electrode, the horizontal-type movable electrode horizontally vibrates along the front surface of the semiconductor substrate between the mutually-adjoining fixed electrodes. Thus the swing portion connected to the movable electrode horizontally vibrates in the same vibration phase and period as that of the movable electrode. As a consequence, the mirror supported by the swing portion can resonate in the horizontal direction and can swing about the beam as a swing axis.

In the present MEMS mirror device, the movable electrode may preferably include a vertical-type movable electrode configured to alternately displace toward and away from the second cavity in a direction intersecting a front surface of the semiconductor substrate. If a drive voltage of the same polarity or different polarities is alternately applied between the fixed electrode and the vertical-type movable electrode, the vertical-type movable electrode vertically vibrates in the direction intersecting the front surface of the semiconductor substrate. Thus the swing portion connected to the movable electrode vertically vibrates in the same vibration phase and period as that of the movable electrode. As a consequence, the mirror supported by the swing portion can swing about the beam as a swing axis.

The vertical vibration of the movable electrode directly causes the mirror to move in a swinging motion. Therefore, as compared with a case where the mirror indirectly swings responsive to the resonance of the mirror, it is possible to sufficiently move the mirror in a swinging motion even if the extent of the motion of the movable electrode is narrow. As a result, it is possible to reduce the voltage for driving the vertical-type movable electrode. In the case of vertically driving the movable electrode, at least one of the vertical-type movable electrode and the fixed electrode may preferably be warped away from the second cavity to protrude out from a front surface of the other electrode or warped toward a rear surface of the semiconductor substrate to protrude out from a rear surface of the other electrode.

Consequently, a specified gap extending along a vertical direction can be formed between the vertical-type movable electrode and the fixed electrode. It is therefore possible to generate a Coulomb attraction force and a Coulomb repulsion force having a component greater than zero in the vertical direction (the drive direction). Accordingly, the vertical-type movable electrode can be easily driven by a small drive voltage. In the present MEMS mirror device, the semiconductor substrate may preferably be an electrically conductive silicon substrate.

If the semiconductor substrate is formed of the electrically conductive silicon substrate, the shaped substrate can be directly used as electrodes without having to perform special processing, which would otherwise be performed to impart conductivity to the comb-teeth-like fixed electrode and the comb-teeth-like movable electrode. In addition, the portion other than the portions used as the electrodes can be used as a wiring line. In the present manufacturing method, the step of forming the second cavity may preferably include: forming a protective film on side walls of the fixed electrode and the movable electrode; selectively removing the protective film from a bottom surface of the electrode trench; and, after removing the protective film, forming the second cavity by digging the electrode trench through anisotropic etching and then removing lower portions of the fixed electrode and the movable electrode through isotropic etching.

In the present manufacturing method, the side walls of the fixed electrode and the movable electrode are covered with a protective film. It is therefore possible to prevent the etching medium from making contact with the side walls of the fixed electrode and the movable electrode when forming the second cavity by the isotropic etching of the semiconductor substrate. This makes it possible to reduce erosion of the fixed electrode and the movable electrode, thereby diminishing variations in the size of the fixed electrode and the movable electrode.

The present MEMS mirror module is provided with the present MEMS mirror device. It is therefore possible to realize a small-sized MEMS mirror module.

BRIEF DESCRIPTION OF THE DRAWINGS

FIG. 6 is a schematic plan view showing a MEMS mirror device according to a second embodiment of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as to not unnecessarily obscure aspects of the various embodiments.

<Use Form of MEMS Mirror Module>

Figure 1:
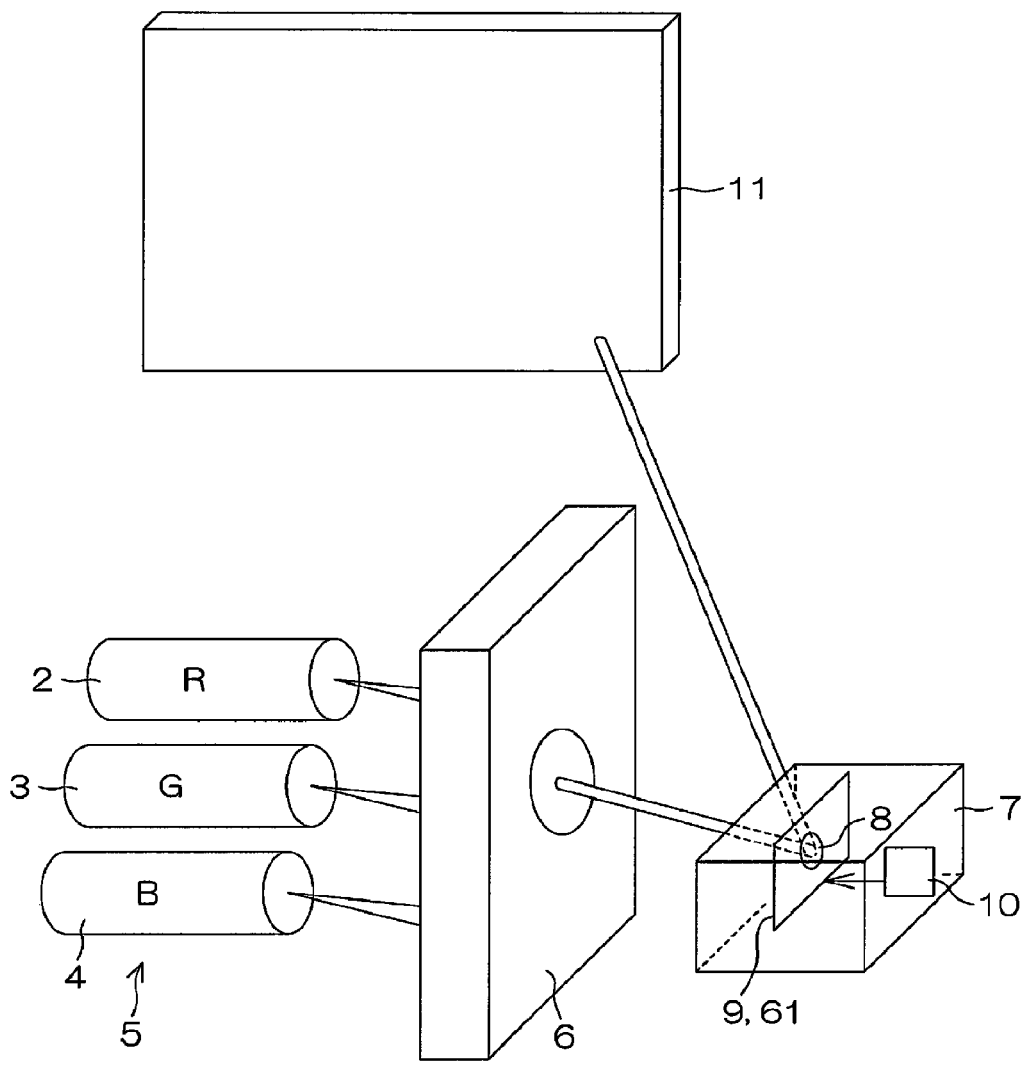
FIG. 1 is a schematic configuration view showing a laser projector that includes a MEMS mirror module according to some embodiments.

FIG. 1 is a schematic configuration view showing a laser projector that includes a MEMS mirror module according to some embodiments. Referring to FIG. 1, description will be made on a case where a MEMS mirror module is employed in a laser projector.

A laser projector 1 includes a laser light source 5 which includes a red laser diode 2, a green laser diode 3 and a blue laser diode 4, an RGB combiner 6 and a MEMS mirror module 7. The MEMS mirror module 7 includes a MEMS mirror device 9 having a mirror 8 for reflecting laser light, and a drive IC (Integrated Circuit) 10 as one example of a driver for driving the MEMS mirror device 9. While only one MEMS mirror device 9 is shown in FIG. 1, it will be appreciated that a plurality of MEMS mirror devices 9 as a mirror array may be arranged in a matrix pattern within the MEMS mirror module 7. In such case, each of the MEMS mirror devices 9 is provided in a one-to-one correspondence to each of the pixels forming an image projected on a screen 11.

In the laser projector 1, laser beams of three colors emitted from the laser light source 5, namely a red laser beam (having a wavelength of from 635 nm to 640 nm), a green laser beam (having a wavelength of from 510 nm to 535 nm) and a blue laser beam (having a wavelength of from 450 nm to 460 nm), are combined by the RGB combiner 6. The laser beams thus combined are reflected toward the screen 11 by the mirror 8 of the respective MEMS mirror devices 9 applied with a voltage and turned on under the control of the drive IC 10. Thus the laser beams reflected from the respective MEMS mirror devices 9 are collected on the screen 11 and are projected as a desired image.

<Overall Configuration of MEMS Mirror Device (Horizontal Drive Type)>

Figure 2:
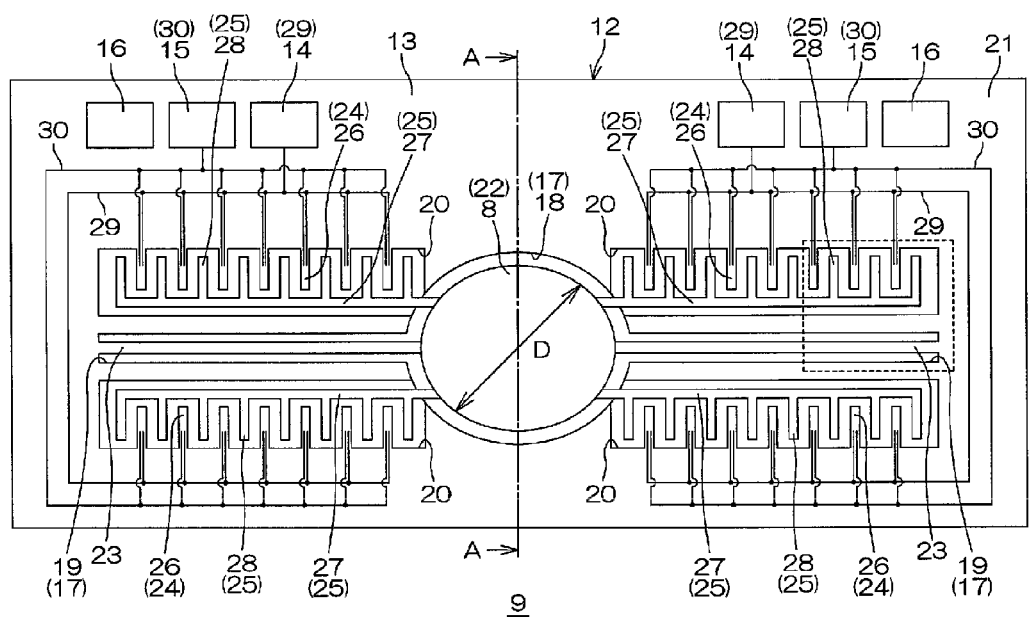
FIG. 2 is a schematic plan view showing a MEMS mirror device according to a first embodiment of the present disclosure.

FIG. 2 is a schematic plan view showing a MEMS mirror device 9 according to a first embodiment of the present disclosure.

Referring next to FIG. 2, description will be made on the overall configuration of the MEMS mirror device 9. The MEMS mirror device 9 includes a semiconductor substrate 12 having a rectangular shape in a plan view. The MEMS mirror device 9 is of a horizontal drive type in which comb-teeth-like movable electrodes 25 (to be described later) meshing with comb-teeth-like fixed electrodes 24 (to be described later) vibrates horizontally along a front surface 13 of the semiconductor substrate 12. The semiconductor substrate 12 is formed of, e.g., an electrically conductive silicon substrate having a thickness $T_1$ (see FIGS. 4A and 4B) of from 300 µm to 725 µm (e.g., a low-resistance substrate having a resistivity of from 5 µm to 500 µm).

In a peripheral edge portion extending along one longitudinal side of the semiconductor substrate 12, electrode pads 14 through 16 having a rectangular shape in a plan view are arranged along the longitudinal side. Three electrode pads 14 through 16 are provided at one side with respect to a center of the longitudinal side of the semiconductor substrate 12 and three electrode pads 14 through 16 are provided at the other side. Wires (not shown) are connected to the electrode pads 14 through 16 so that a voltage can be applied from the drive IC 10 (see FIG. 1) to the electrode pads 14 through 16.

A first cavity 17 with an open bottom is formed in the semiconductor substrate 12. The first cavity 17 includes a mirror cavity 18 formed in a central region of the semiconductor substrate 12 to have a circular shape in a plan view and two linear beam cavities 19 extending in a direction (longitudinal direction) along the longitudinal side of the semiconductor substrate and having a width $W_1$ (e.g., see FIG. 3) smaller than the diameter D of the mirror cavity 18. One of the beam cavities 19 is arranged at one side of the mirror cavity 18 in the longitudinal direction of the semiconductor substrate 12. The other beam cavity 19 is arranged at the other side of the mirror cavity 18. The diameter D of the mirror cavity 18 is, e.g., from 500 µm to 2000 µm. The width $W_1$ of each of the beam cavities 19 is, e.g., from 1 µm to 10 µm.

In a peripheral region surrounding the central region of the semiconductor substrate 12, there is formed a plurality of electrode cavities 20 as one example of a second cavity with a closed bottom. Two electrode cavities 20 are arranged at one side of the mirror cavity 18 in the longitudinal direction of the semiconductor substrate 12 and two electrode cavities 20 are arranged at the other side of the mirror cavity 18. Thus the electrode cavities 20 are formed in two sets in total. The electrode cavities 20 of each set are formed parallel to each other with each of the beam cavities 19 interposed therebetween. One of the electrode cavities 20 of each set is formed at a side close to the electrode pads 14 through 16 and the other electrode cavity 20 of each set is formed at a side distant from the electrode pads 14 through 16. The end portion of each of the electrode cavities 20 close to the mirror cavity 18 communicates with the mirror cavity 18, whereby the electrode cavities 20 and the mirror cavity 18 are connected to each other.

The mirror cavity 18, the beam cavities 19 and the electrode cavities 20 are defined by a frame portion 21 of the semiconductor substrate 12. The frame portion 21 refers to a portion kept unprocessed even after a swing portion 22, beams 23, fixed electrodes 24 and movable electrodes 25 to be described later are formed by processing the semiconductor substrate 12. The frame portion 21 has a thickness equal to the original thickness $T_1$ of the semiconductor substrate 12 (e.g., from 300 µm to 725 µm).

The semiconductor substrate 12 includes a swing portion 22, beams 23, fixed electrodes 24 and movable electrodes 25, all of which are formed by partially processing the semiconductor substrate 12. The swing portion 22 is formed into a circular shape in a plan view. The circular swing portion 22 is arranged just above the mirror cavity 18 to extend along the entire circumferential edge portion of the frame portion 21 surrounding the mirror cavity 18. The swing portion 22 is spaced apart from the circumferential edge portion of the frame portion 21 surrounding the mirror cavity 18.

The mirror 8 is provided on the swing portion 22. The mirror 8 is made of, e.g., aluminum (Al) and is formed to have substantially the same shape as the shape of the swing portion 22. The number of the beams 23 is two (one pair) in total, one in each of the beam cavities 19. Each of the beams 23 is rectilinearly formed to extend along each of the beam cavities 19 from the part of the frame portion 21 defining the end portion of each of the beam cavities 19 close to the short side of the semiconductor substrate 12. Each of the beams 23 has a terminal end portion integrally connected to the swing portion 22. The swing portion 22 is supported at the opposite ends thereof by the beams 23 in such a state that the swing portion 22 floats from the horizontal direction extending along the front surface 13 of the semiconductor substrate 12.

The fixed electrodes 24 having a comb-teeth shape are arranged just above the respective electrode cavities 20 and are fixed to the frame portion 21. The fixed electrodes 24 are formed so that the open ends thereof can face inward in a transverse direction of the semiconductor substrate 12 (a direction extending along the short side of the semiconductor substrate 12). Each set of the fixed electrodes 24 adjoining to each other across each of the beam cavities 19 has teeth 26 formed at an equal pitch $P_1$ (e.g., from 2 µm to 10 µm) (e.g., see FIG. 3) so that the tip ends of the teeth 26 of one of the fixed electrodes 24 can be opposed to the tip ends of the teeth 26 of the other fixed electrode 24 in the transverse direction of the semiconductor substrate 12. In other words, the teeth 26 of the fixed electrodes 24 adjoining to each other are not staggered from one another but are arranged on the same lines extending in the transverse direction of the semiconductor substrate 12. The length $L_1$ of each of the teeth 26 of the fixed electrodes 24 (the distance from the frame portion 21 to the tip end of each of the teeth 26) (see FIG. 3) is, e.g., from 100 µm to 300 µm. The width $W_2$ orthogonal to the length $L_1$ is, e.g., from 0.5 µm to 1.5 µm.

The movable electrodes 25, as one example of horizontal-type movable electrodes, are arranged on the respective electrode cavities 20 and are formed into a comb teeth shape to mesh with the fixed electrodes 24 with a gap left between the fixed electrodes 24 and the movable electrodes 25. The movable electrodes 25 are formed so that the open ends thereof can face outward in the transverse direction of the semiconductor substrate 12. Each of the movable electrodes 25 includes an arm portion 27 extending over each of the electrode cavities 20 and the mirror cavity 18 and rectilinearly extending along the longitudinal direction of the semiconductor substrate 12 and a plurality of teeth 28 positioned just above each of the electrode cavities 20 and arranged at a regular interval along the arm portion 27. The pitch $P_2$ (e.g., see FIG. 3) of the teeth 28 formed in the arm portion 27 is equal to the pitch $P_1$ of the teeth 26 of the fixed electrodes 24 (e.g., from 10 µm to 30 µm). The length $L_2$ of each of the teeth 28 of the movable electrodes 25 (the distance from the arm portion 27 to the tip end of each of the teeth 28) is, e.g., from 100 µm to 300 µm. The width $W_3$ orthogonal to the length $L_2$ is, e.g., from 4 µm to 10 µm.

In the MEMS mirror device 9, there are provided four drive units, one at each of the four corner sides of the semiconductor substrate 12 with respect to the swing portion 22 lying in the central region of the semiconductor substrate 12. Each of the drive units includes the fixed electrode 24 and the movable electrode 25 meshing with each other. The number of the drive units is not limited to four as shown in FIG. 2. Alternatively, a plurality of drive units may be provided at each of the four corner sides of the semiconductor substrate 12, e.g., two or three drive units at each of the four corner sides.

First wiring lines 29 and second wiring lines 30 for applying a voltage to the fixed electrodes 24 are arranged on the semiconductor substrate 12. Each of the first wiring lines 29 and each of the second wiring lines 30 are connected to the respective teeth 26 of the fixed electrodes 24. The wiring lines 29 and 30 are connected to the electrode pads 14 and 15 in the peripheral edge portion of the semiconductor substrate 12. The remaining electrode pad 16 is connected to the frame portion 21 of the semiconductor substrate 12 and functions as a ground wiring line for fixing the voltage of the movable electrodes 25 at the substrate electric potential.

<Major Configurations of Fixed Electrodes and Movable Electrodes>

Figure 3:
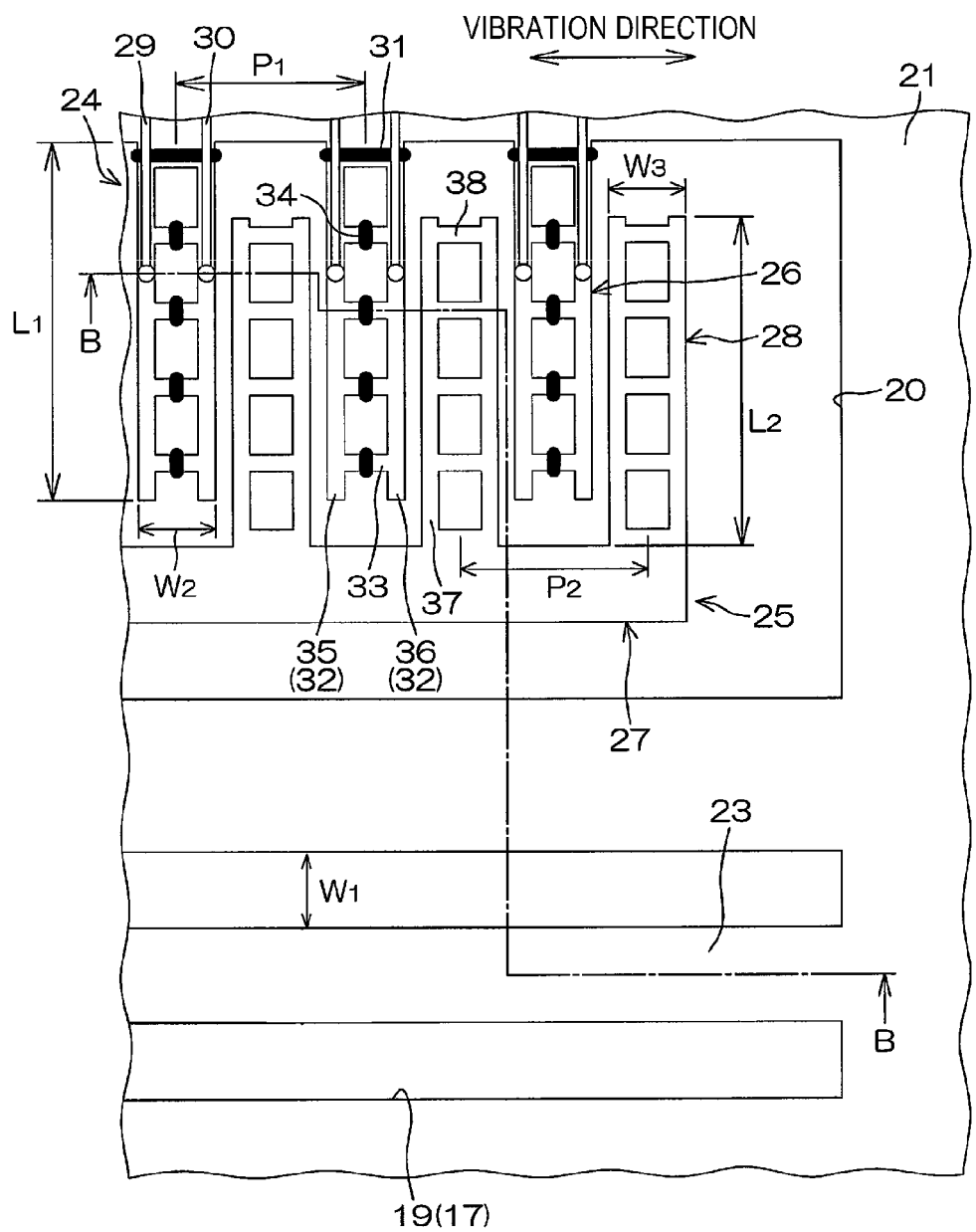
FIG. 3 is an enlarged view showing a major portion of the MEMS mirror device shown in FIG. 2 (the portion surrounded by a broken line in FIG. 2).

FIG. 3 is an enlarged view showing a major portion of the MEMS mirror device shown in FIG. 2 (e.g., the portion surrounded by dotted lines in FIG. 2).

Referring to FIG. 3, description will be made on the detailed structures of the fixed electrodes 24 and the movable electrodes 25. A first isolated insulation film 31 (made of, e.g., silicon oxide ($SiO_2$)) is embedded in a base end portion of each of the teeth 26 of the fixed electrodes 24 close to the frame portion 21. Thus each of the teeth 26 of the fixed electrodes 24 is insulated from the frame portion 21. Each of the insulated teeth 26 of the fixed electrodes 24 has a ladder-like framework structure in a plan view and includes two straight main frames 32 extending parallel to each other and a plurality of transverse frames 33 arranged between the main frames 32. Second isolated insulation films 34 (made of, e.g., silicon oxide ($SiO_2$)) are embedded in the respective transverse frames 33, whereby each of the teeth 26 is divided into two parts along a direction of the transverse frames 33. Accordingly, in each of the teeth 26 of the fixed electrodes 24, the main frame 32 (first main frame 35) lying at one side of the second isolated insulation films 34 and the main frame 32 (second main frame 36) lying at the other side of the second isolated insulation films 34 are insulated from each other and serve as independent electrodes. Each of the first wiring lines 29 extending across the first isolated insulation film 31 is connected to the first main frame 35. Each of the second wiring lines 30 extending across the first isolated insulation film 31 is connected to the second main frame 36.

The reason for dividing each of the teeth 26 of the fixed electrodes 24 into two parts insulated from each other is to prevent the movable electrodes 25 from being inoperable. In other words, if the second isolated insulation films 34 are not provided each of the teeth 26 of the fixed electrodes 24 may not be maintained at the same electric potential. Under these conditions, if a positive voltage is applied to the fixed electrodes 24, a Coulomb attraction force acting toward the mirror 8 is applied to each of the movable electrodes 25, which is fixed at the substrate electric potential, by each of the fixed electrodes 24 positioned at the same side of each of the movable electrodes 25 as the mirror 8. At the same time, a Coulomb attraction force acting away from the mirror 8 is applied to each of the movable electrodes 25 by each of the fixed electrodes 24 positioned at the opposite side of each of the movable electrodes 25 from the mirror 8. As a result, the combined force applied to each of the movable electrodes 25 in the drive direction (the longitudinal direction of the semiconductor substrate 12) becomes zero, thereby making each of the movable electrodes 25 inoperable. The reason for dividing each of the teeth 26 of the fixed electrodes 24 into two parts is to prevent the phenomenon above from occurring.

On the other hand, if each of the teeth 26 of the fixed electrodes 24 is divided into two parts and if, for example, a positive voltage is applied to the first main frame 35 close to the mirror 8 while a negative voltage is applied to the second main frame 36 distant from the mirror 8, a Coulomb repulsion force acting away from the mirror 8 can be applied to each of the movable electrodes 25, which is fixed at the substrate electric potential, by the second main frame 36 of each of the fixed electrodes 24 close to the mirror 8. At the same time, a Coulomb attraction force acting away from the mirror 8 can be applied to each of the movable electrodes 25 by the first main frame 35 of each of the fixed electrodes 24 distant from the mirror 8. As a result, the combined force applied to each of the movable electrodes 25 in the drive direction (the longitudinal direction of the semiconductor substrate 12) can be made equal to the sum of the Coulomb attraction force and the Coulomb repulsion force. It is therefore possible to reliably drive each of the movable electrodes 25. In order to horizontally vibrate each of the movable electrodes 25, voltages having opposite polarities are repeatedly applied between the first main frame 35 and the second main frame 36 in an alternating manner.

Similar to the fixed electrodes 24, each of the teeth 28 of the movable electrodes 25 has a ladder-like framework structure in a plan view and includes two straight main frames 37 extending parallel to each other and a plurality of transverse frames 38 arranged between the main frames 37.

<Cross-Sectional Configuration of MEMS Mirror Device 9>

Figure 4A:
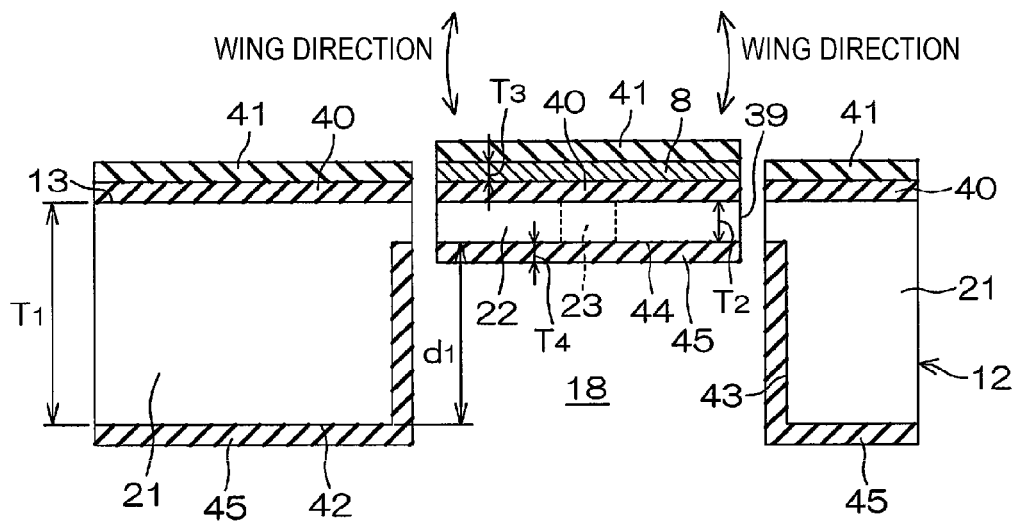
FIG. 4A is a section view of the MEMS mirror device shown in FIG. 2 that shows the cross section taken along section line A-A in FIG. 2.
Figure 4B:
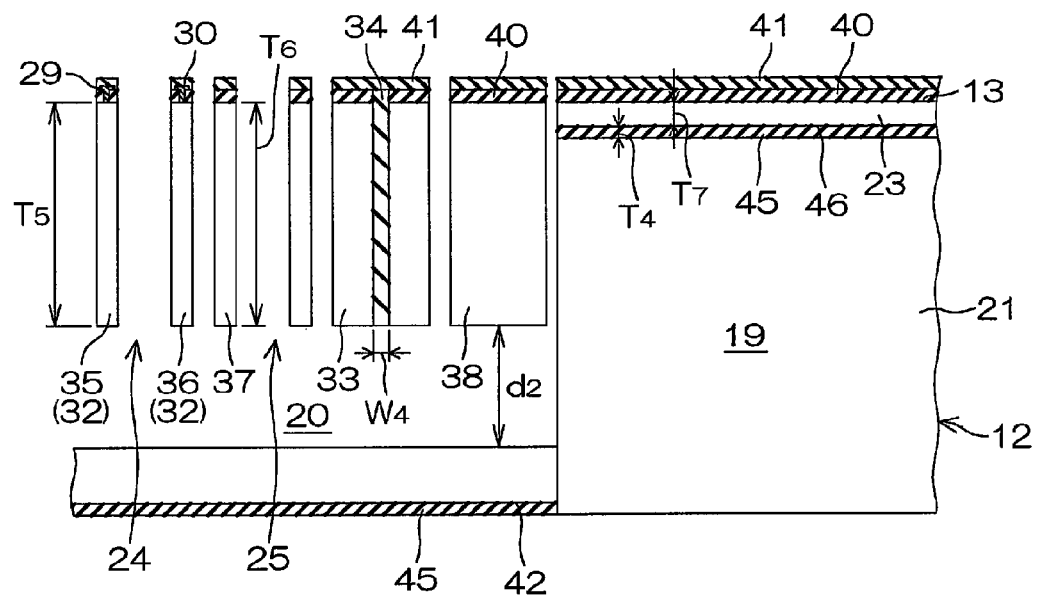
FIG. 4B is a section view of the MEMS mirror device shown in FIG. 2 that shows the cross section taken along section line B-B in FIG. 3

FIGS. 4A and 4B are section views of the MEMS mirror device shown in FIG. 2 that show the cross sections taken along section line A-A in FIG. 2 and section line B-B in FIG. 3, respectively.

Referring next to FIGS. 4A and 4B, description will be made on a major cross-sectional structure of the MEMS mirror device 9. In the A-A cross section, the thickness $T_2$ of the swing portion 22 is, e.g., from 5 µm to 50 µm. The thickness $T_1$ of the frame portion 21 is, e.g., from 300 µm to 725 µm. A gap of, e.g., from 1 µm to 20 µm, exists between the swing portion 22 and the frame portion 21. The depth $d_1$ of the mirror cavity 18 (the distance from the rear surface 42 of the semiconductor substrate 12 to the rear surface 44 of the swing portion 22) is, e.g., from 295 µm to 720 µm.

An interlayer insulation film 40 made of silicon oxide ($SiO_2$) is formed on the front surface 13 of the semiconductor substrate 12 including the swing portion 22. The thickness of the interlayer insulation film 40 is, e.g., from 0.2 µm to 1 µm. The mirror 8 existing above the swing portion 22 is formed on the interlayer insulation film 40. The thickness $T_3$ of the mirror 8 is, e.g., from 0.1 µm to 1 µm. A passivation film 41 made of silicon nitride (SiN) or silicon oxide ($SiO_2$) is formed on the interlayer insulation film 40 so as to cover the front surface of the mirror 8. The thickness of the passivation film 41 is, e.g., from 0.5 µm to 1.5 µm.

In some other embodiments, a rear surface insulation film 45 made of silicon oxide ($SiO_2$) is formed on the entire rear surface 42 of the semiconductor substrate 12 so as to cover the side surface 43 of the frame portion 21 defining the mirror cavity 18 at the lateral side thereof and the rear surface 44 of the swing portion 22 defining the mirror cavity 18 at the upper side thereof. The thickness $T_4$ of the rear surface insulation film 45 is, e.g., from 0.5 µm to 1 µm. In the fixed electrodes 24 taken along section line B-B, the second isolated insulation films 34 insulating and separating the first main frame 35 and the second main frame 36 of each of the fixed electrodes 24 are embedded into the semiconductor substrate 12 to extend from the front surface of each of the fixed electrodes 24 (the front surface 13 of the semiconductor substrate 12) to the rear surface thereof. The width $W_4$ of the second isolated insulation films 34 is, e.g., from 1 µm to 2 µm. While not shown in the drawings, the first isolated insulation film 31 is also embedded into the semiconductor substrate 12 to extend from the front surface of each of the fixed electrodes 24 (the front surface 13 of the semiconductor substrate 12) to the rear surface thereof.

The thickness $T_5$ of the fixed electrodes 24 and the thickness $T_6$ of the movable electrodes 25 are, e.g., from 10 µm to 20 µm. The depth $d_2$ of the electrode cavities 20 (the distance from the rear surfaces of the fixed electrodes 24 and the movable electrodes 25 to the bottoms of the electrode cavities 20) is, e.g., from 5 µm to 20 µm. The interlayer insulation film 40 and the passivation film 41, which have been described above with respect to the A-A cross section, are also formed on the fixed electrodes 24. The first wiring lines 29 and the second wiring lines 30 connected to the fixed electrodes 24 are installed on the front surface of the interlayer insulation film 40. The front surfaces of the first wiring lines 29 and the second wiring lines 30 are covered with the passivation film 41. The first wiring lines 29 and the second wiring lines 30 extend through the interlayer insulation film 40 and are respectively connected to the first main frames 35 and the second main frames 36 of the fixed electrodes 24.

In the beams 23 taken along section line B-B, the thickness $T_7$ of the beams 23 is equal to the thickness $T_2$ of the swing portion 22 and is, e.g., from 5 µm to 50 µm. The interlayer insulation film 40 and the passivation film 41, which have been described above with respect to the A-A cross section, are also formed on the beams 23. On the other hand, the rear surface insulation film 45 described above in connection with the A-A cross section is formed on the rear surfaces 46 of the beams 23 so as to cover the entire regions of the rear surfaces 46.

<Operating Method of MEMS Mirror Device>

Referring to FIGS. 1 through 4B, the MEMS mirror device 9 is operated by repeatedly applying voltages of opposite polarities between the first main frames 35 and the second main frames 36 in an alternating manner through the first wiring lines 29 and the second wiring lines 30 by means of the drive IC 10 in a state that the movable electrodes 25 are fixed at the substrate electric potential. For example, a positive voltage (of, e.g., from 50 V to 300 V) is first applied to the first main frames 35 while applying a negative voltage (of, e.g., from −50 V to −300 V) to the second main frames 36. Then, a negative voltage is applied to the first main frames 35 while applying a positive voltage to the second main frames 36. This operation is performed repeatedly. This effect makes it possible to alternately generate a Coulomb repulsion force and a Coulomb attraction force between the fixed electrodes 24 and the movable electrodes 25 positioned at the same side of the fixed electrodes 24 as the mirror 8. As a result, it becomes possible to vibrate the movable electrodes 25 in the longitudinal direction of the semiconductor substrate 12 (e.g., see the solid line arrow in FIG. 3).

Since the vibration is transferred to the swing portion 22 connected to the arm portions 27 of the movable electrodes 25, the swing portion 22 vibrates in the same vibration phase and period as those of the movable electrodes 25. As a consequence, the mirror 8 supported by the swing portion 22 can resonate in the longitudinal direction of the semiconductor substrate 12 and can swing about the beams 23 as a swing axis (see the solid line arrows in FIG. 4A). This makes it possible to turn the MEMS mirror device 9 on, whereby the laser beams combined by the RGB combiner 6 can be reflected at a specified angle.

<Manufacturing Method of MEMS Mirror Device 9>

Figure 5A:
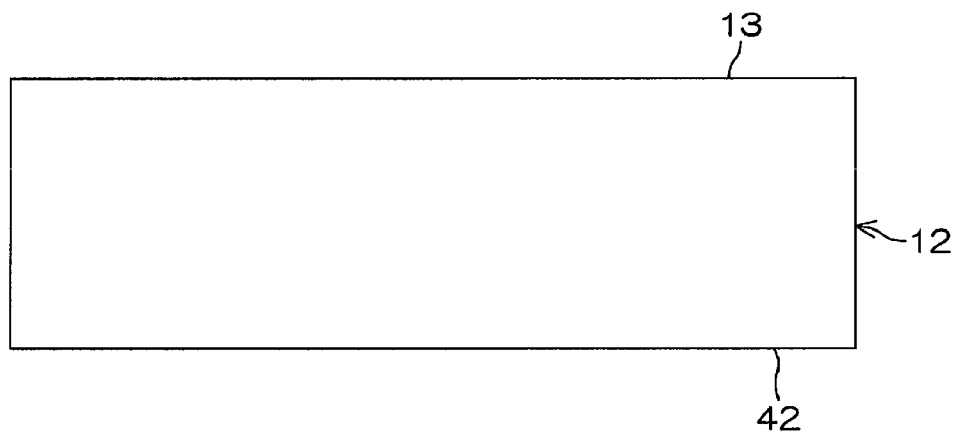
FIG. 5A is a view illustrating a step of a manufacturing process of the MEMS mirror device shown in FIG. 2, which shows the cross section taken in the same position as in FIG. 4A.
Figure 5B:
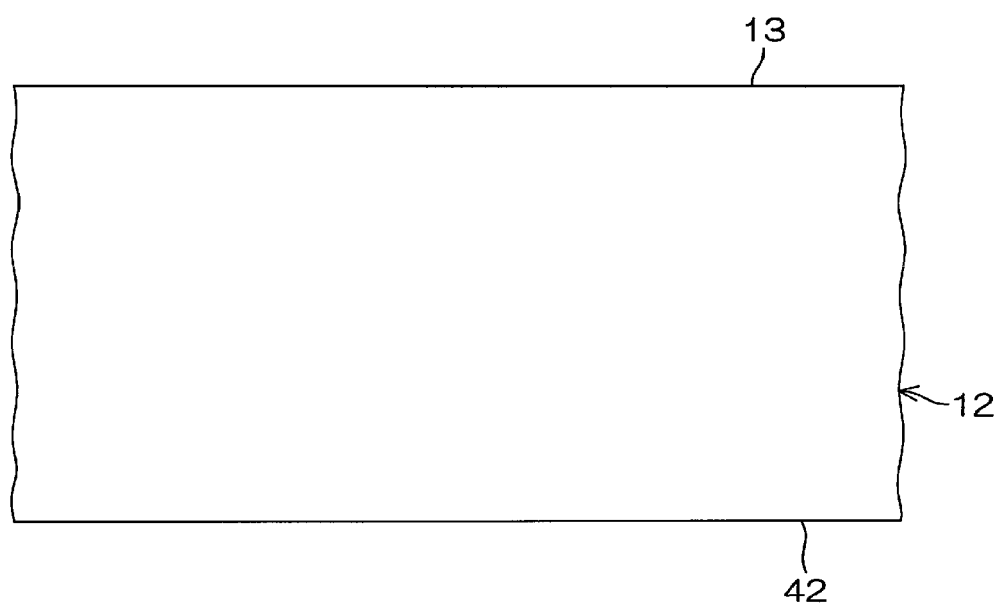
FIG. 5B is a view illustrating a step of a manufacturing process of the MEMS mirror device shown in FIG. 2, which shows the cross section taken in the same position as in FIG. 4B.
Figure 5C:
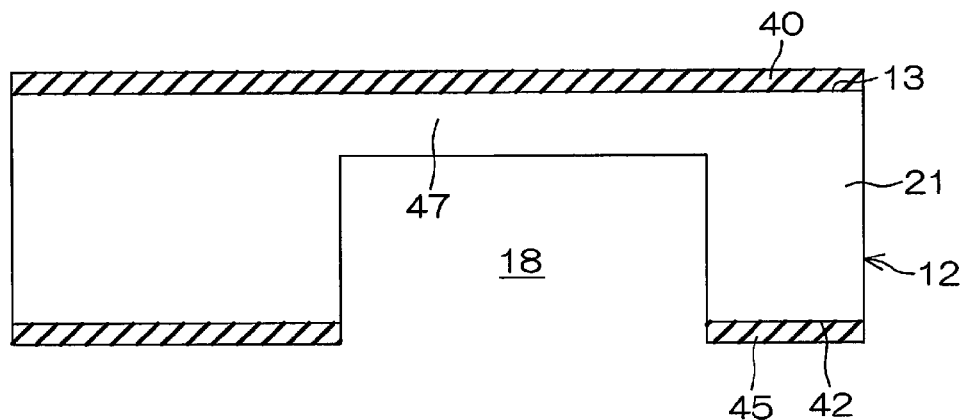
FIG. 5C is a view illustrating the next step of the step illustrated in FIG. 5A.
Figure 5D:
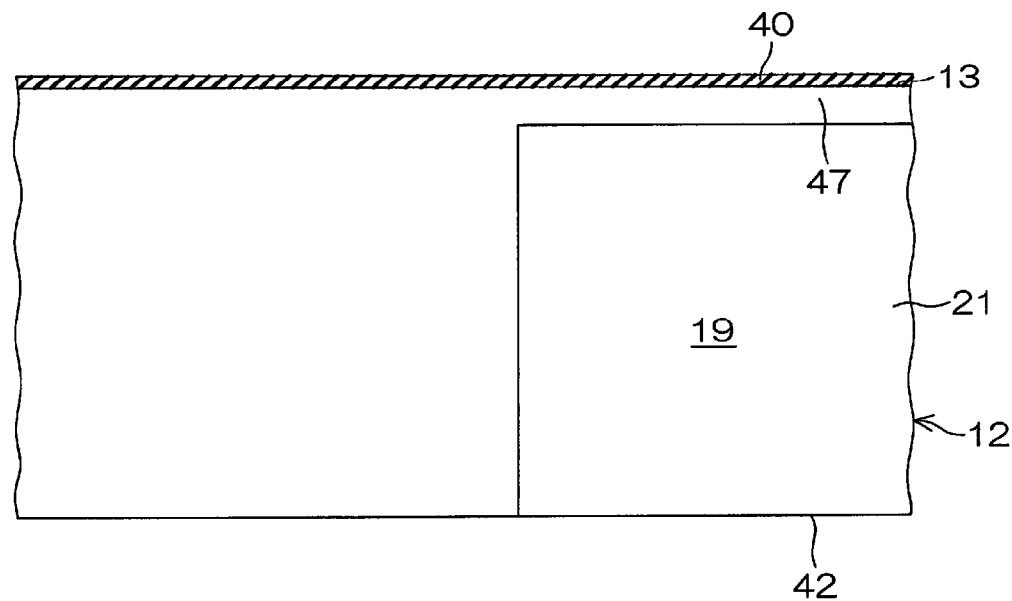
FIG. 5D is a view illustrating the next step of the step illustrated in FIG. 5B.
Figure 5E:
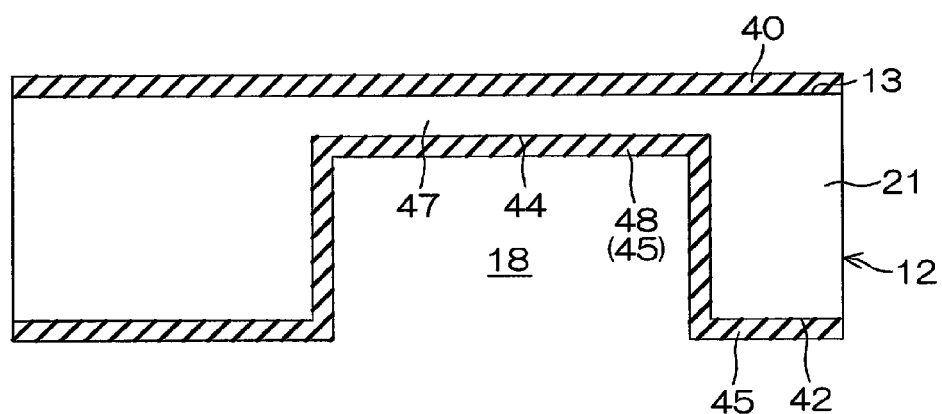
FIG. 5E is a view illustrating the next step of the step illustrated in FIG. 5C.
Figure 5F:
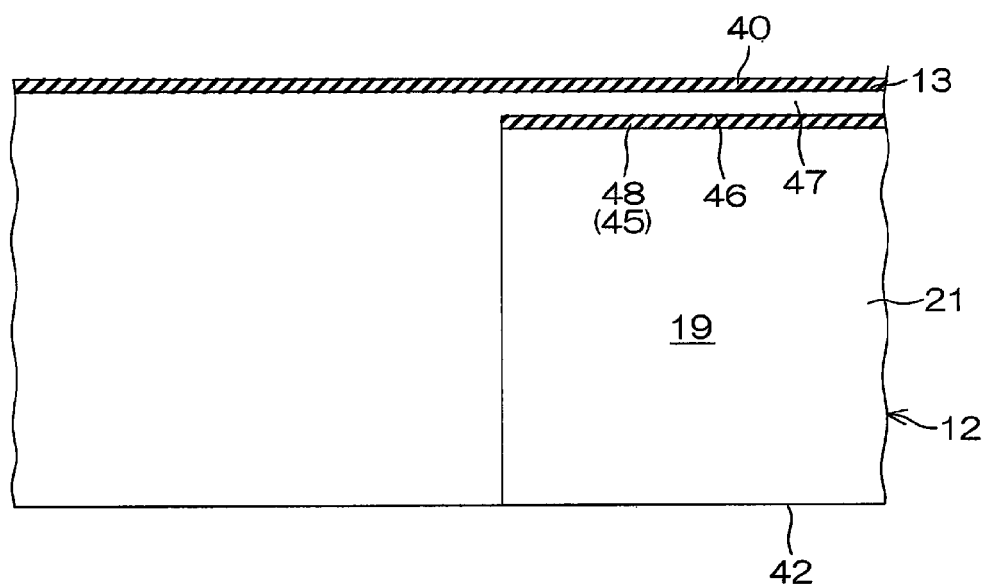
FIG. 5F is a view illustrating the next step of the step illustrated in FIG. 5D.
Figure 5G:
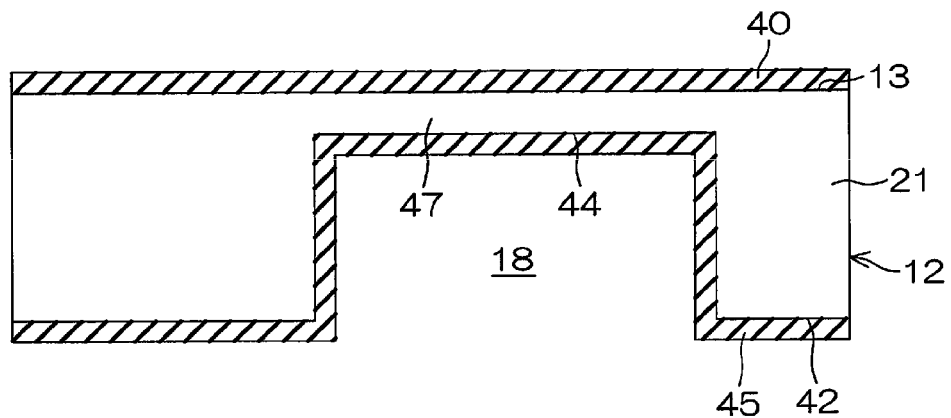
FIG. 5G is a view illustrating the next step of the step illustrated in FIG. 5E.
Figure 5H:
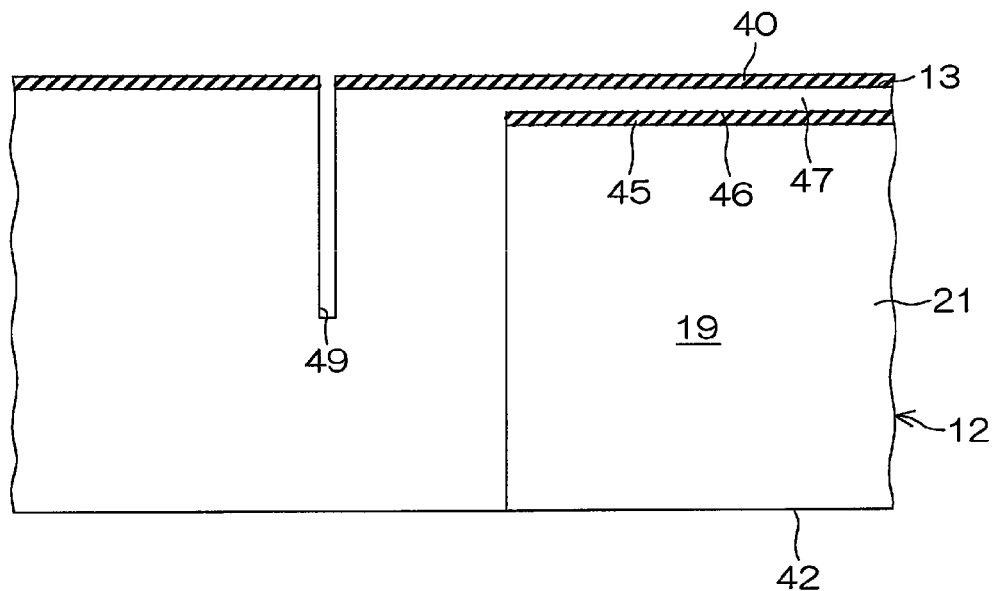
FIG. 5H is a view illustrating the next step of the step illustrated in FIG. 5F.
Figure 5I:
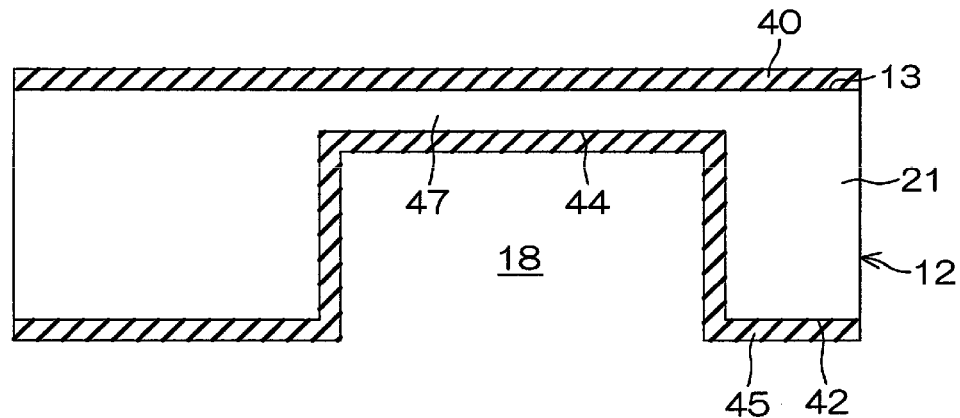
FIG. 5I is a view illustrating the next step of the step illustrated in FIG. 5G.
Figure 5J:
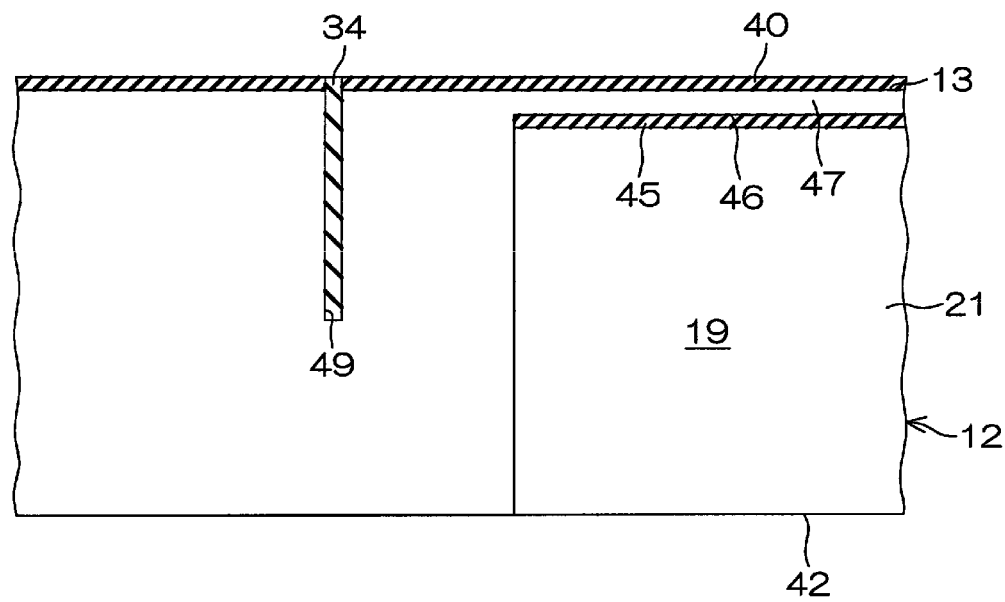
FIG. 5J is a view illustrating the next step of the step illustrated in FIG. 5H.
Figure 5K:
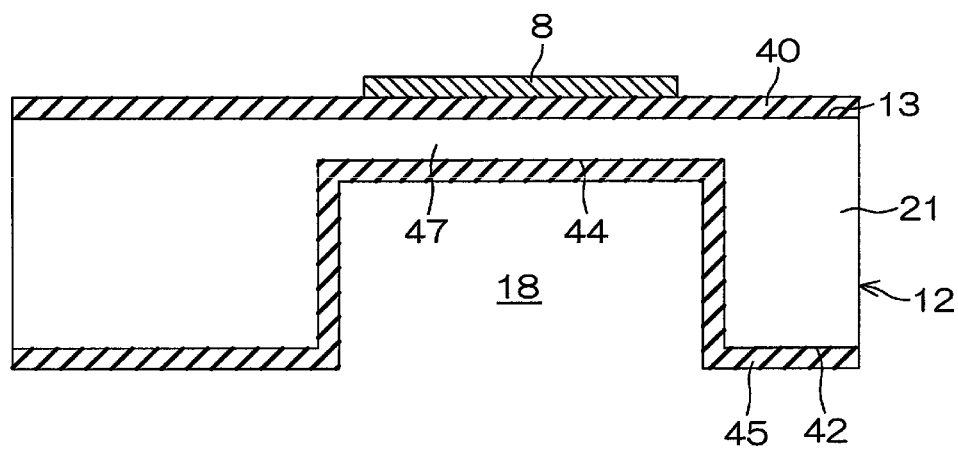
FIG. 5K is a view illustrating the next step of the step illustrated in FIG. 5I.
Figure 5L:
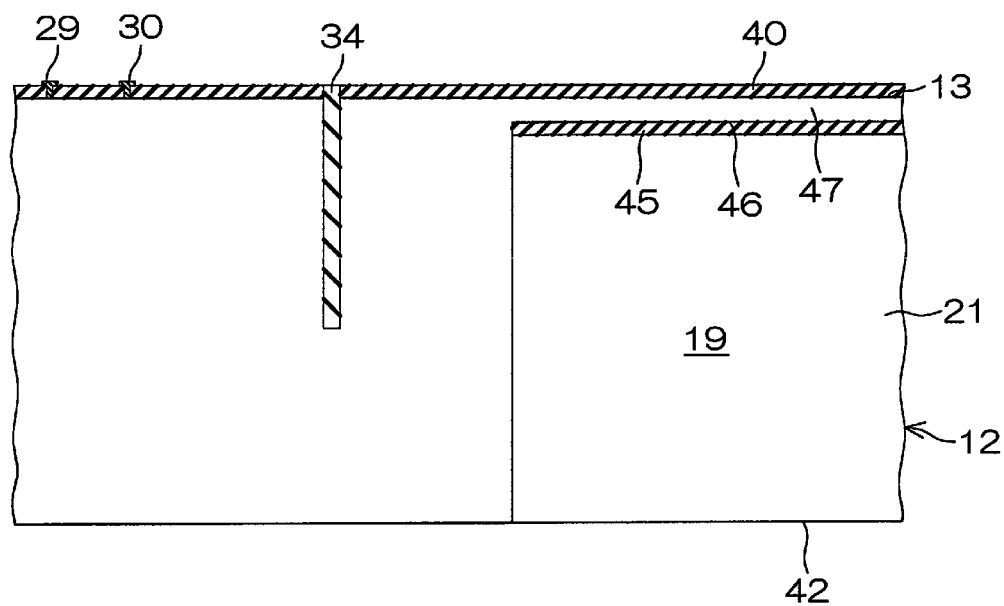
FIG. 5L is a view illustrating the next step of the step illustrated in FIG. 5J.
Figure 5M:
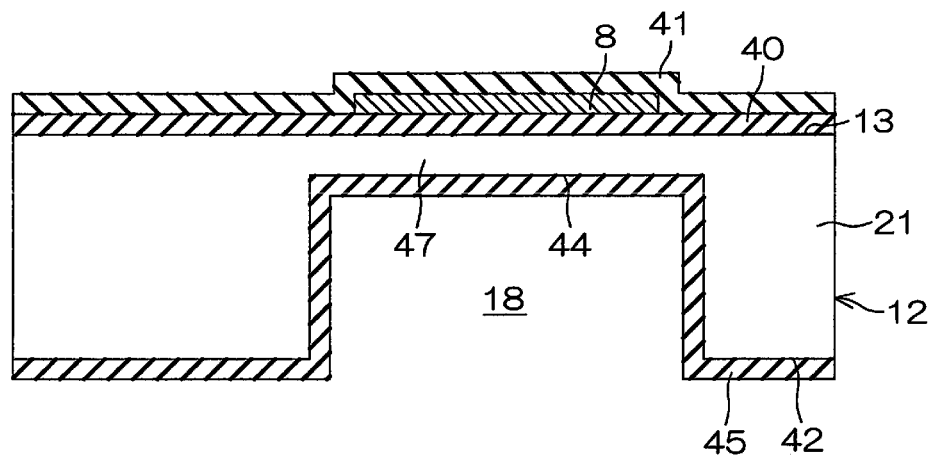
FIG. 5M is a view illustrating the next step of the step illustrated in FIG. 5K.
Figure 5N:
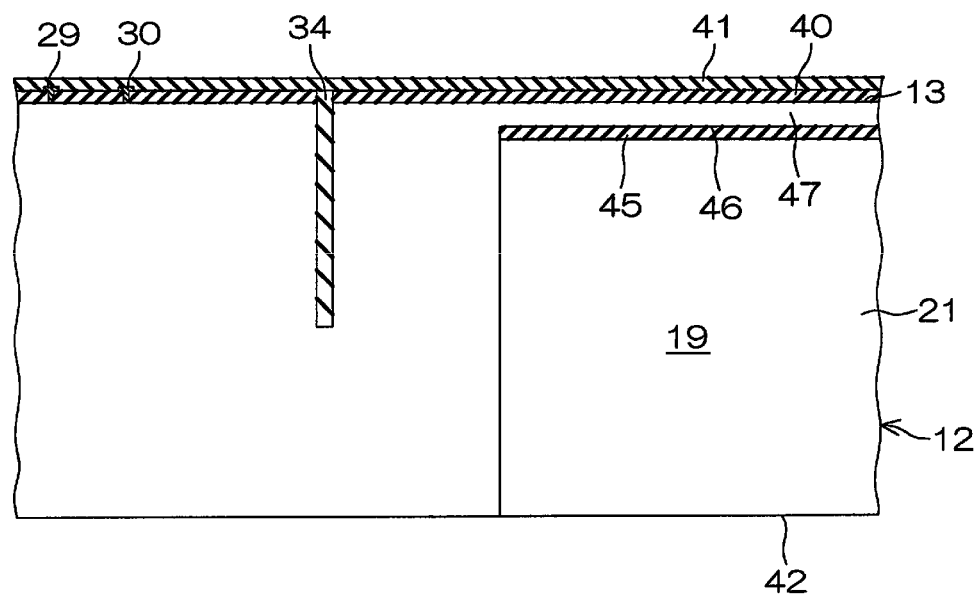
FIG. 5N is a view illustrating the next step of the step illustrated in FIG. 5L.
Figure 5O:
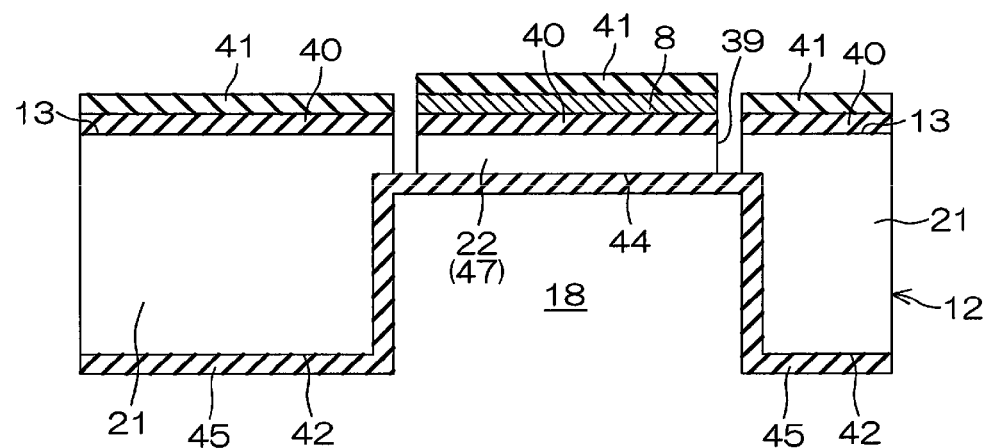
FIG. 5O is a view illustrating the next step of the step illustrated in FIG. 5M.
Figure 5P:
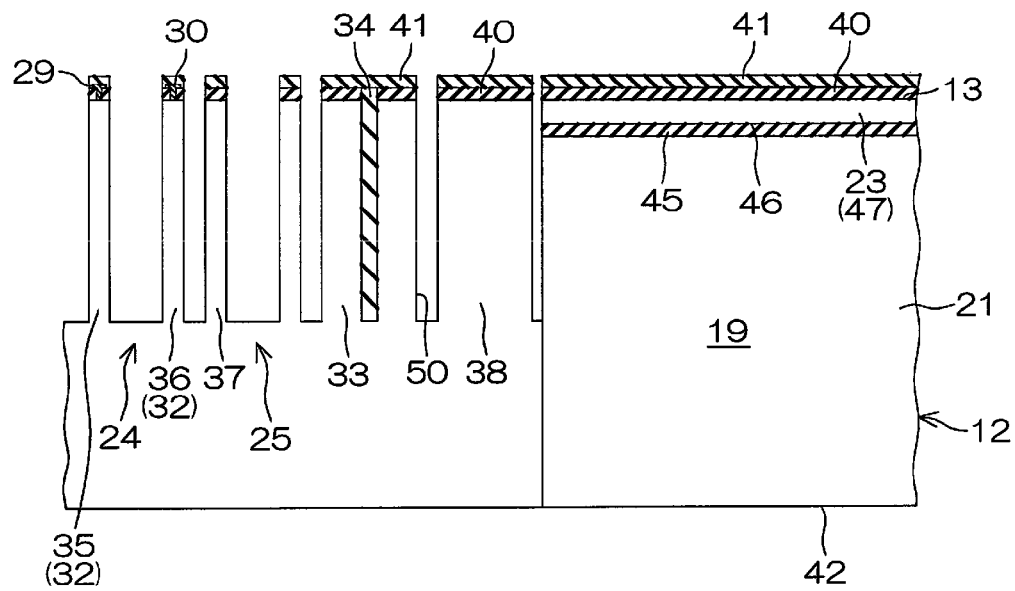
FIG. 5P is a view illustrating the next step of the step illustrated in FIG. 5N.
Figure 5Q:
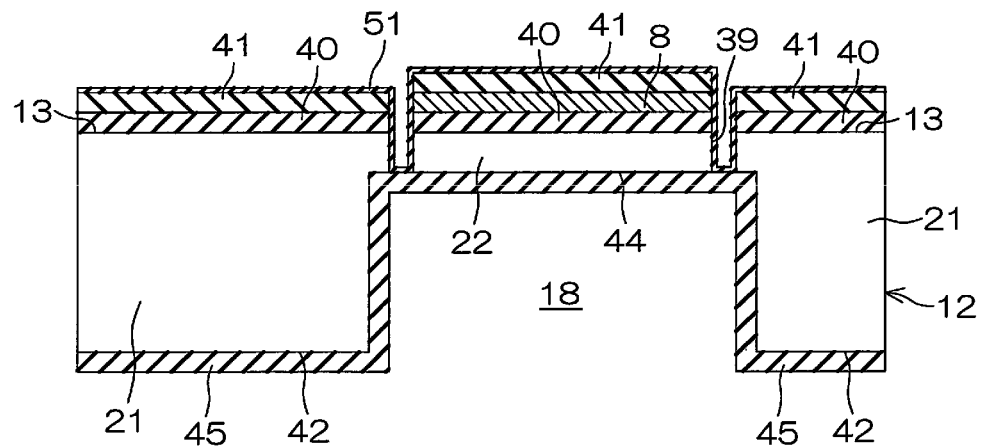
FIG. 5Q is a view illustrating the next step of the step illustrated in FIG. 5O.
Figure 5R:
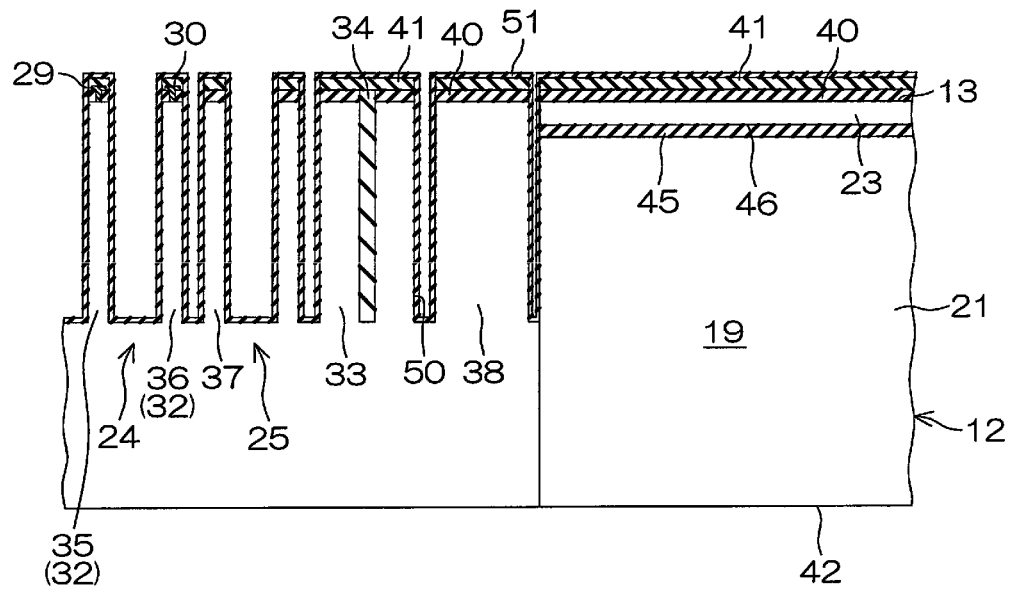
FIG. 5R is a view illustrating the next step of the step illustrated in FIG. 5P.
Figure 5S:
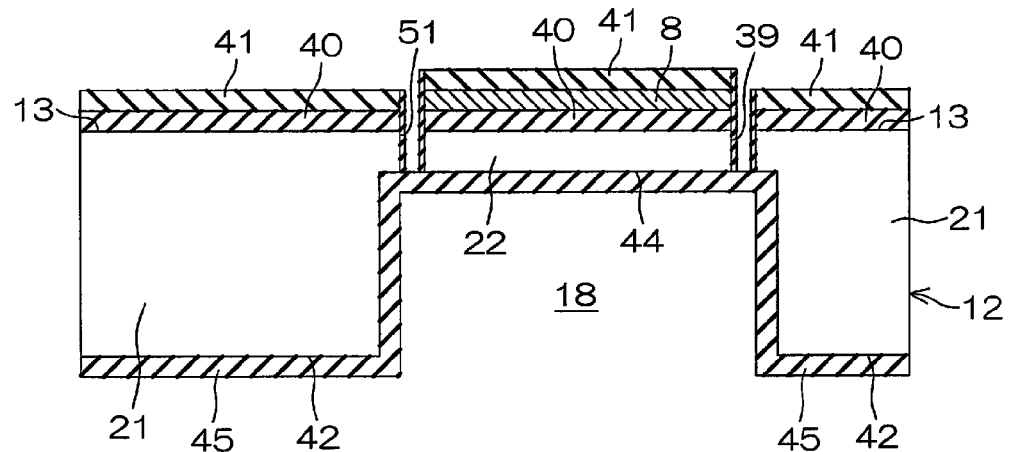
FIG. 5S is a view illustrating the next step of the step illustrated in FIG. 5Q.
Figure 5T:
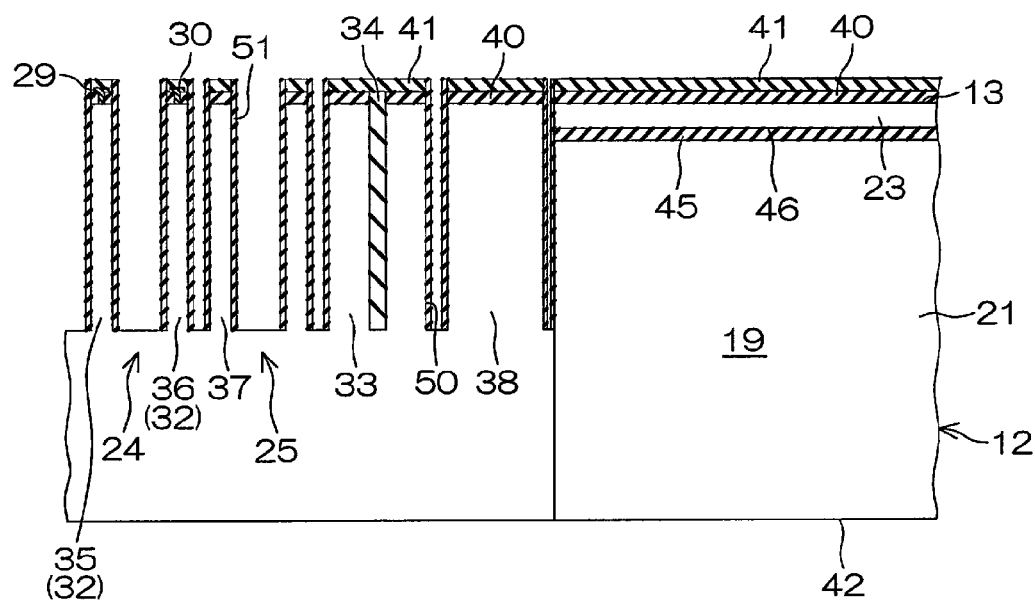
FIG. 5T is a view illustrating the next step of the step illustrated in FIG. 5R.
Figure 5U:
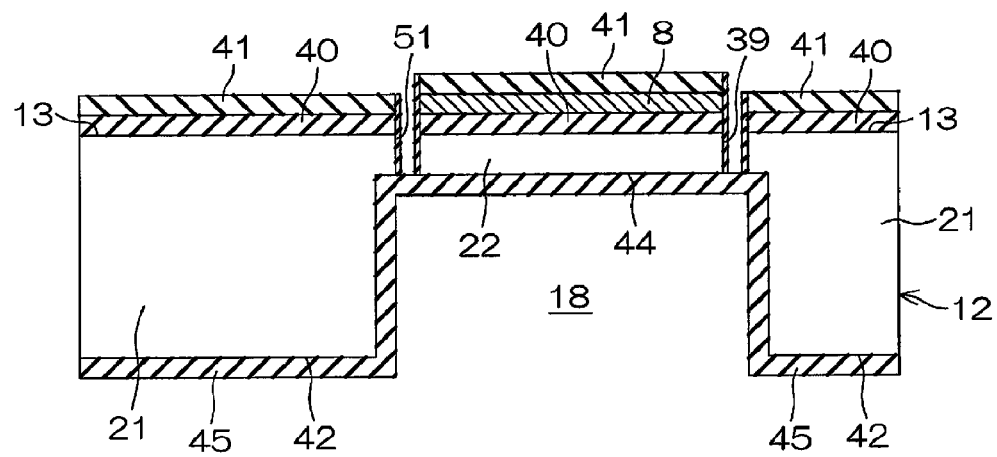
FIG. 5U is a view illustrating the next step of the step illustrated in FIG. 5S.
Figure 5V:
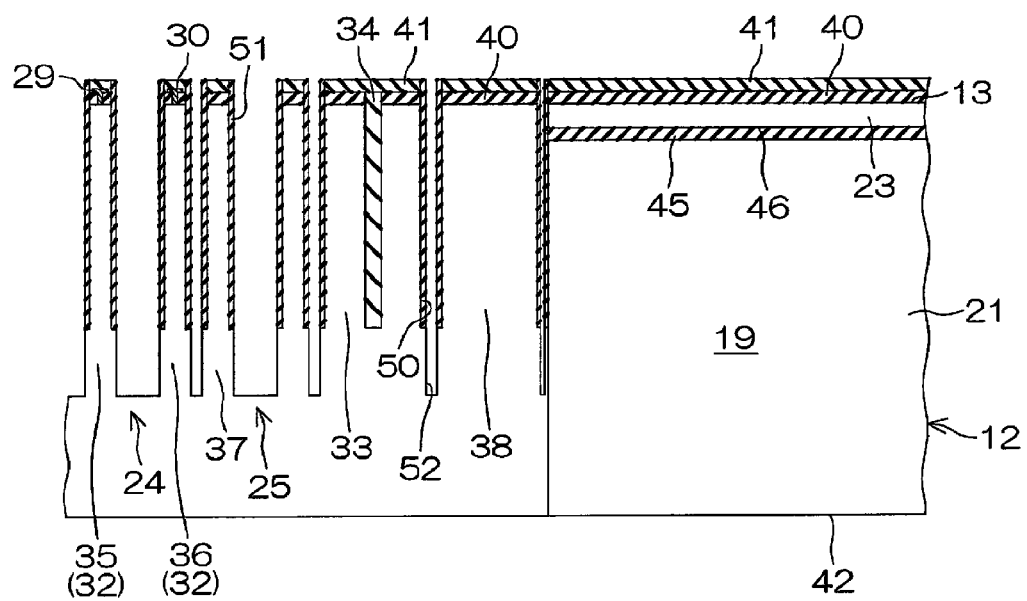
FIG. 5V is a view illustrating the next step of the step illustrated in FIG. 5T.
Figure 5W:
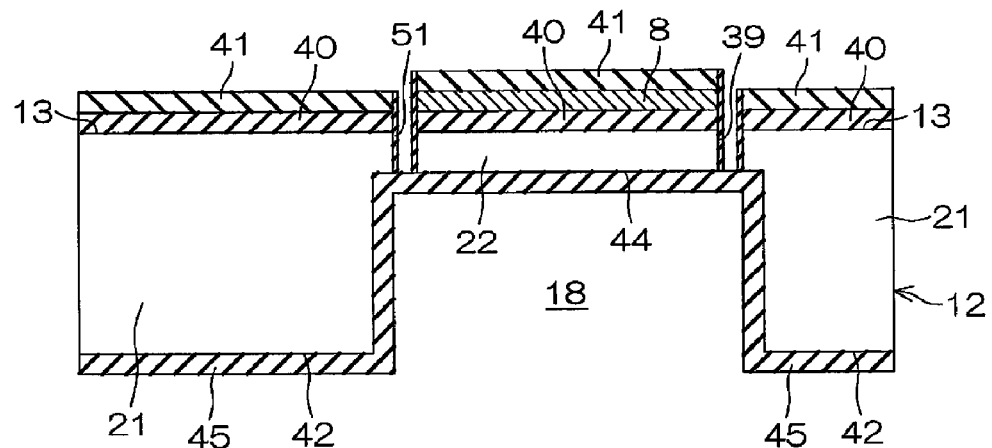
FIG. 5W is a view illustrating the next step of the step illustrated in FIG. 5U.
Figure 5X:
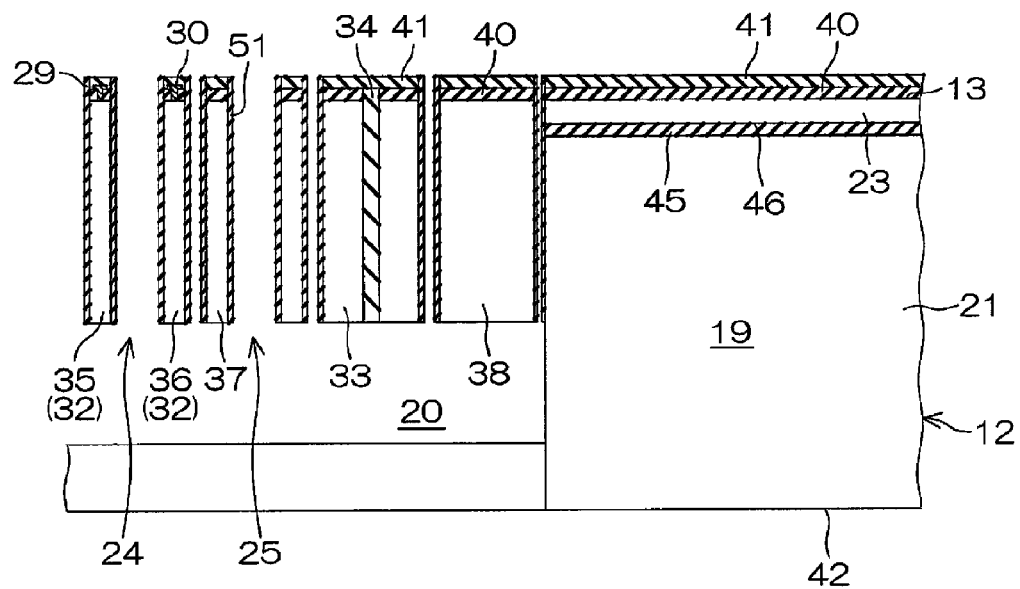
FIG. 5X is a view illustrating the next step of the step illustrated in FIG. 5V.
Figure 5Y:
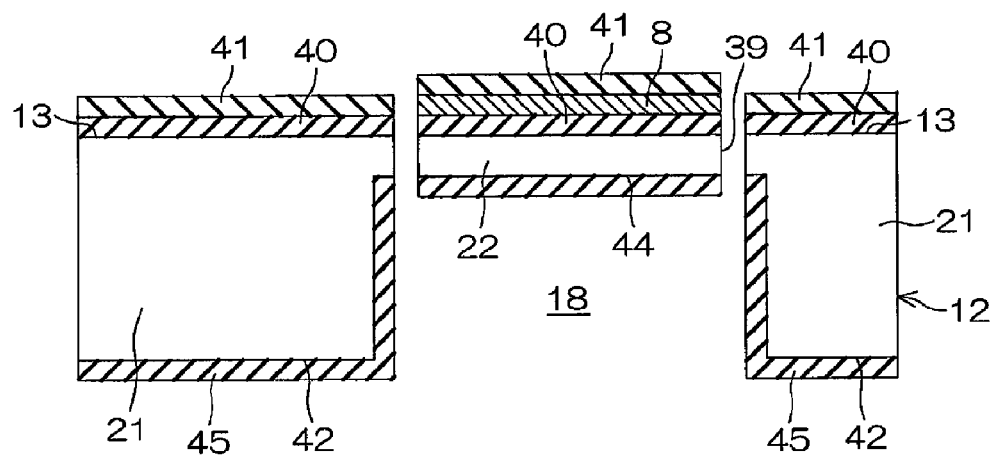
FIG. 5Y is a view illustrating the next step of the step illustrated in FIG. 5W.
Figure 5Z:
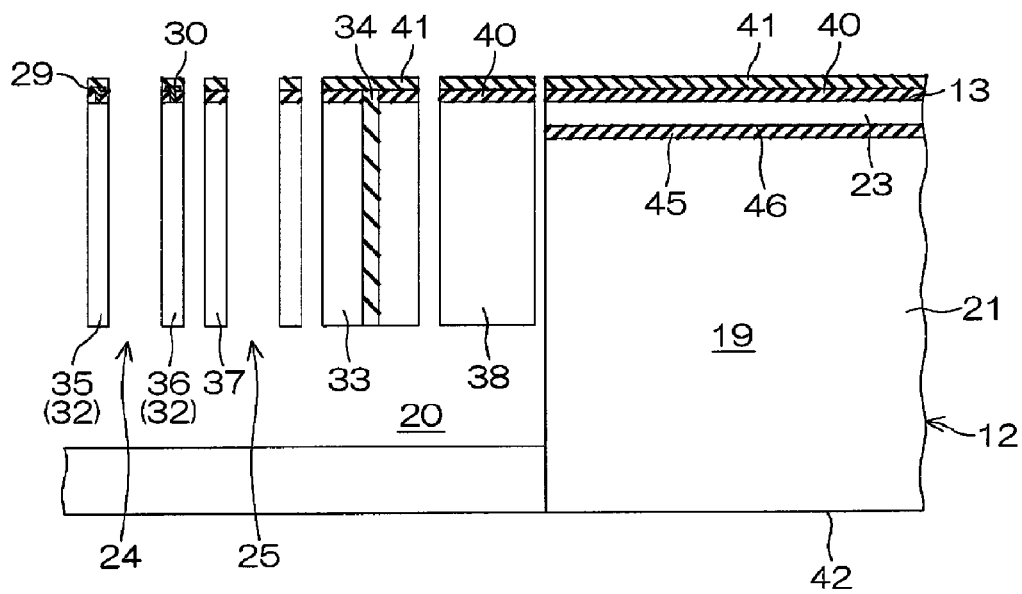
FIG. 5Z is a view illustrating the next step of the step illustrated in FIG. 5X.

FIGS. 5A through 5Z are views illustrating steps of a manufacturing process of the MEMS mirror device 9 shown in FIG. 2. In FIGS. 5A, 5C, 5E, 5G, 5I, 5K, 5M, 5O, 5Q, 5S, 5U, 5W, and 5Y, A-A cross section shows the cross section taken along section line A-A in FIG. 2, as in FIG. 4A. In FIGS. 5B, 5D, 5F, 5H, 5J, 5L, 5N, 5P, 5R, 5T, 5V, 5X, and 5Z, B-B line shows the cross section taken along section line B-B in FIG. 3 as in FIG. 4B.

In order to manufacture the MEMS mirror device 9 described above, a semiconductor substrate 12 having a front surface 13 and a rear surface 42 is first prepared as shown in FIGS. 5A and 5B. Next, as shown in FIGS. 5C and 5D, an interlayer insulation film 40 is formed on the front surface 13 of the semiconductor substrate 12 and a rear surface insulation film 45 is formed on the rear surface 42 of the semiconductor substrate 12, by a thermal oxidation method (e.g., by performing thermal oxidation processing at a temperature of from 1000 degrees C. to 1200 degrees C.). Subsequently, the regions of the rear surface insulation film 45, in which the first cavity 17 (the mirror cavity 18 and the beam cavities 19) is to be formed, are selectively removed by a well-known patterning technique. Then, the semiconductor substrate 12 is etched from the rear surface 42 by a dry etching method in which the remaining rear surface insulation film 45 is used as a hard mask. Consequently, the mirror cavity 18 and the beam cavities 19 opened at the side of the rear surface 42 of the semiconductor substrate 12 are formed and a surface layer portion 47 of the semiconductor substrate 12 is formed at the side of the front surface 13 of the semiconductor substrate 12 with respect to the mirror cavity 18 and the beam cavities 19. Also formed is a frame portion 21 that defines the mirror cavity 18 and the beam cavities 19 at the lateral side thereof.

Next, as shown in FIGS. 5E and 5F, the regions of the semiconductor substrate 12 exposed to the mirror cavity 18 and the beam cavities 19 are thermally oxidized (subjected to thermal oxidation processing at a temperature of, e.g., from 900 degrees C. to 1200 degrees C.), thereby forming an insulation film 48 on the side surface 43 of the frame portion 21 and the rear surfaces 44 and 46 of the surface layer portion 47. The insulation film 48 is unified with the rear surface insulation film 45. Subsequently, as shown in FIGS. 5G and 5H, the regions of the interlayer insulation film 40, in which a first isolated insulation film 31 and a second isolated insulation films 34 are formed, are removed by a well-known patterning technique. Then, the semiconductor substrate 12 is burrowed down from the front surface 13 thereof by anisotropic deep RIE (Reactive Ion Etching), more particularly a Bosch process, in which the remaining interlayer insulation film 40 is used as a hard mask. Thus a plurality of isolating trenches 49 is formed in the semiconductor substrate 12. In the Bosch process, a step of etching the semiconductor substrate 12 through the use of $SF_6$ (sulfur hexafluoride) and a step of forming a protective film on the etched surface through the use of $C_4F_8$ (perfluorocyclobutane) are alternately repeated. This makes it possible to etch the semiconductor substrate 12 at a high aspect ratio. A wavy asperity called a scallop is formed on the etched surface (the inner circumferential surfaces of the isolating trenches 49).

Next, as shown in FIGS. 5I and 5J, the inner surfaces of the isolating trenches 49 formed in the semiconductor substrate 12 are thermally oxidized (subjected to thermal oxidation processing at a temperature of, e.g., from 1000 degrees C. to 1200 degrees C.). Thereafter, the surface of an oxide film is etched. Thus a first isolated insulation film 31 and a second isolated insulation films 34 filling the isolating trenches 49 are formed at the same time (only the second isolated insulation films 34 is shown in FIGS. 5I and 5J for illustration purposes). Subsequently, as shown in FIGS. 5K and 5L, contact holes are formed in the interlayer insulation film 40 by selectively removing the interlayer insulation film 40. Then, contact plugs are formed to fill the contact holes. Thereafter, aluminum (Al) is deposited on the interlayer insulation film 40 by a sputtering method. The aluminum deposition layer is patterned, whereby a mirror 8, first wiring lines 29 and second wiring lines 30 are formed at the same time.

Next, as shown in FIGS. 5M and 5N, a passivation film 41 is formed on the interlayer insulation film 40 by a CVD (Chemical Vapor Deposition) method so as to cover the mirror 8, the first wiring lines 29 and the second wiring lines 30. Subsequently, as shown in FIGS. 5O and 5P, the passivation film 41 and the interlayer insulation film 40 are selectively removed by a well-known patterning technique. Then, the semiconductor substrate 12 is burrowed own from the front surface 13 thereof by anisotropic deep RIE, more particularly a Bosch process, in which the passivation film 41 is used as a hard mask. Consequently, the semiconductor substrate 12 is shaped to have fixed electrodes 24 and movable electrodes 25. Electrode trenches 50 defined in the semiconductor substrate 12 are formed between the fixed electrodes 24 and the movable electrodes 25. At the same time, the surface layer portion 47 is shaped to have a swing portion 22 and beams 23. A gap 39, the lower end of which is closed by the rear surface insulation film 45, is formed to surround the swing portion 22 and the beams 23.

At this time, with a view to simultaneously form the fixed electrodes 24 and the swing portion 22 differing in thickness from each other, additional etching with no contribution to the formation of the swing portion 22 and the like may be continuously performed in the regions for formation of the swing portion 22 and the beams 23 having a relatively small thickness even after the formation of the swing portion 22 or the like. In the present embodiment, as one example, the lower end of the gap 39 existing between the surface layer portion 47 and the frame portion 21 of the semiconductor substrate 12 may be closed by the rear surface insulation film 45, wherein the surface layer portion 47 is to be processed into the swing portion 22 and the beams 23. Since the rear surface insulation film 45 serves as a stopper film against an etching gas such as $SF_6$ or the like used in the etching step, it is possible to prevent the etching gas fed for formation of the fixed electrodes 24 from flowing toward the side of the first cavity 17 (the mirror cavity 18 and the beam cavities 19) with respect to the swing portion 22 and the beams 23 after the formation of the swing portion 22 and the like.

Next, as shown in FIGS. 5Q and 5R, a protective thin film 51 made of silicon oxide ($SiO_2$) is formed, by a thermal oxidation method or a PECVD (Plasma Enhanced Chemical Vapor Deposition) method, on the front surface 13 of the semiconductor substrate 12 including the entire inner surface regions of the electrode trenches 50 and the gap 39. Then, as shown in FIGS. 5S and 5T, the portion of the protective thin film 51 other than the portion formed on the side surfaces of the electrode trenches 50 is selectively removed by etching-back. Thus the bottom surfaces of the electrode trenches 50 come into an exposed state.

Next, as shown in FIGS. 5U and 5V, the bottom surfaces of the electrode trenches 50 are further burrowed own by anisotropic deep RIE in which the passivation film 41 is used as a hard mask. Consequently, exposed spaces 52 to which the crystal surface of the semiconductor substrate 12 is exposed are formed in the bottom portions of the electrode trenches 50. At this time, the rear surface insulation film 45 closing the lower end of the gap 39 serves as a stopper film against an etching gas such as $SF_6$ or the like used in the etching step. It is therefore possible to prevent the etching gas fed for formation of the exposed spaces 52 from flowing toward the side of the first cavity 17 with respect to the swing portion 22 and the beams 23.

Next, as shown in FIGS. 5W and 5X, reactive ions and an etching gas are fed to the exposed spaces 52 of the electrode trenches 50 by isotropic RIE. Under the action of the reactive ions, the semiconductor substrate 12 is etched in the thickness direction thereof from the respective exposed spaces 52 and is also etched in the direction parallel to the front surface 13 thereof. As a consequence, all the exposed spaces 52 adjoining to each other are unified to thereby form electrode cavities 20 inside the semiconductor substrate 12. The fixed electrodes 24 and the movable electrodes 25 are kept floating within the electrode cavities 20.

Next, as shown in FIGS. 5Y and 5Z, the remaining portion of the protective thin film 51 and the portion of the rear surface insulation film 45 closing the gap 39 are selectively removed by dry etching in which the passivation film 41 is used as a hard mask. Thus the swing portion 22 and the beams 23 are kept floating in the mirror cavity 18 and the beam cavities 19, respectively. The MEMS mirror device 9 shown in FIGS. 2 through 4B is obtained through the steps described above.

According to the manufacturing method of the MEMS mirror device 9 of the present embodiment described above, the first cavity 17 (the mirror cavity 18 and the beam cavities 19) may be formed by etching the semiconductor substrate 12 from the rear surface 42 thereof to the thickness-wise intermediate portion thereof as shown in FIGS. 5C and 5D. Thereafter, as shown in FIGS. 5O and 5P, the surface layer portion 47 of the semiconductor substrate 12 formed at the side of the front surface 13 with respect to the first cavity 17 is etched to reach the stopper insulation film and is selectively removed (see FIGS. 5O and 5P).

The swing portion 22 and the beams 23 are formed using the remaining surface layer portion 47. Thus the swing portion 22 and the beams 23 made up of the surface layer portion 47 of the semiconductor substrate 12 are formed and, at the same time, the mirror cavity 18 is formed as a space for enabling the swing portion 22 (the mirror 8) to move in a swinging motion. In this manner, the mirror cavity 18 having a relatively wide area (e.g., a diameter D of from 500 μm to 2000 μm) required to enable the swing movement of the mirror 8 can be defined by etching the semiconductor substrate 12 to the thickness-wise intermediate portion thereof. Therefore, unlike the case where a cavity is formed to extend through the lower plate in the thickness direction as in the related art, it is possible to reduce the amount of the etching gas impinging on the etching process, against the support table of an etching apparatus for supporting the semiconductor substrate 12 at the side of the rear surface 42.

In a series of steps (the steps shown in FIGS. 5O through 5X) of forming the fixed electrodes 24 and the movable electrodes 25 and forming the electrode cavities 20 immediately below the fixed electrodes 24 and the movable electrodes 25, the rear surface insulation film 45 closes the lower end of the gap 39 and serves as a stopper film against the etching gas when the etching gas is supplied from the side of the front surface 13 of the semiconductor substrate 12. It is therefore possible to prevent the etching gas from flowing toward the side of the first cavity 17 with respect to the swing portion 22 and the beams 23.

Similarly, the electrode cavities 20 for making it possible to drive the movable electrodes 25 are formed by etching the semiconductor substrate 12 to the thickness-wise intermediate portion to define the electrode trenches 50 as shown in FIGS. 5O and 5P, further digging the bottom surfaces of the electrode trenches 50 as shown in FIGS. 5U and 5V, and eventually unifying all the exposed spaces 52 by isotropic etching as shown in FIGS. 5W and 5X. Accordingly, when forming the electrode cavities 20, it is equally possible to reduce the amount of the etching gas impinging against the support table of an etching apparatus.

In the MEMS mirror device 9 shown in FIGS. 2 through 4B, the frame portion 21, the fixed electrodes 24, the movable electrodes 25, the beams 23 and the swing portion 22 are all formed by partially processing the semiconductor substrate 12. Therefore, it is not necessary to use a plurality of substrates to form these component members as in the related art. For that reason, the overall thickness of the MEMS mirror device 9 is approximately equal to the thickness $T_1$ of the semiconductor substrate 12. This makes it possible reduce the size of the MEMS mirror device 9.

In other words, the present embodiment makes it possible to manufacture a small-sized MEMS mirror device 9 while reducing the burden to the etching apparatus. In the MEMS mirror device 9, the fixed electrodes 24 are insulated from the frame portion 21 by the first isolated insulation films 31. Accordingly, the front surface of the frame portion 21 (the front surface 13 of the semiconductor substrate 12) can be efficiently used as a space for forming the first wiring lines 29 and the second wiring lines 30.

Since the semiconductor substrate 12 is formed of an electrically conductive silicon substrate, the finished structure can be directly used as electrodes without having to perform special processing which would otherwise be performed to impart conductivity to the fixed electrodes 24 and the movable electrodes 25 formed into a specified shape. Inasmuch as the movable electrodes 25 integrally formed with the frame portion 21 are electrically connected to the frame portion 21, the frame portion 21 can be used as a wiring line for fixing the voltage of the movable electrodes 25 at the substrate electric potential.

The rear surface insulation film 45 (the stopper film) remaining on the rear surfaces 44 and 46 of the swing portion 22 and the beams 23 may be left as shown in FIGS. 4A and 4B even after the MEMS mirror device 9 is manufactured or may be partially or completely removed by etching. In the manufacturing method of the MEMS mirror device 9 of the present embodiment, as shown in FIGS. 5O and 5P, the semiconductor substrate 12 can be simultaneously processed into the shape of the swing portion 22, the beams 23, the fixed electrodes 24 and the movable electrodes 25 by etching in which the passivation film 41 is used as a hard mask. Therefore, as compared with a case where the swing portion 22, the beams 23, the fixed electrodes 24 and the movable electrodes 25 are formed independently of one another, it is possible to reduce the number of steps. As a result, it becomes possible to efficiently manufacture the MEMS mirror device 9.

As shown in FIGS. 5U through 5X, when forming the electrode cavities 20, the side walls of the fixed electrodes 24 and the movable electrodes 25 are covered with the protective thin film 51. It is therefore possible to prevent the etching medium from making contact with the side walls of the fixed electrodes 24 and the movable electrodes 25. This makes it possible to reduce erosion of the fixed electrodes 24 and the movable electrodes 25, thereby diminishing variations in the size of the fixed electrodes 24 and the movable electrodes 25.

The MEMS mirror module 7 shown in FIG. 1 is provided with the MEMS mirror device 9 shown in FIGS. 2 through 4B. It is therefore possible to realize a small-sized MEMS mirror module.

<Another Embodiment of MEMS Mirror Device (Vertical Drive Type)>

Figure 7:
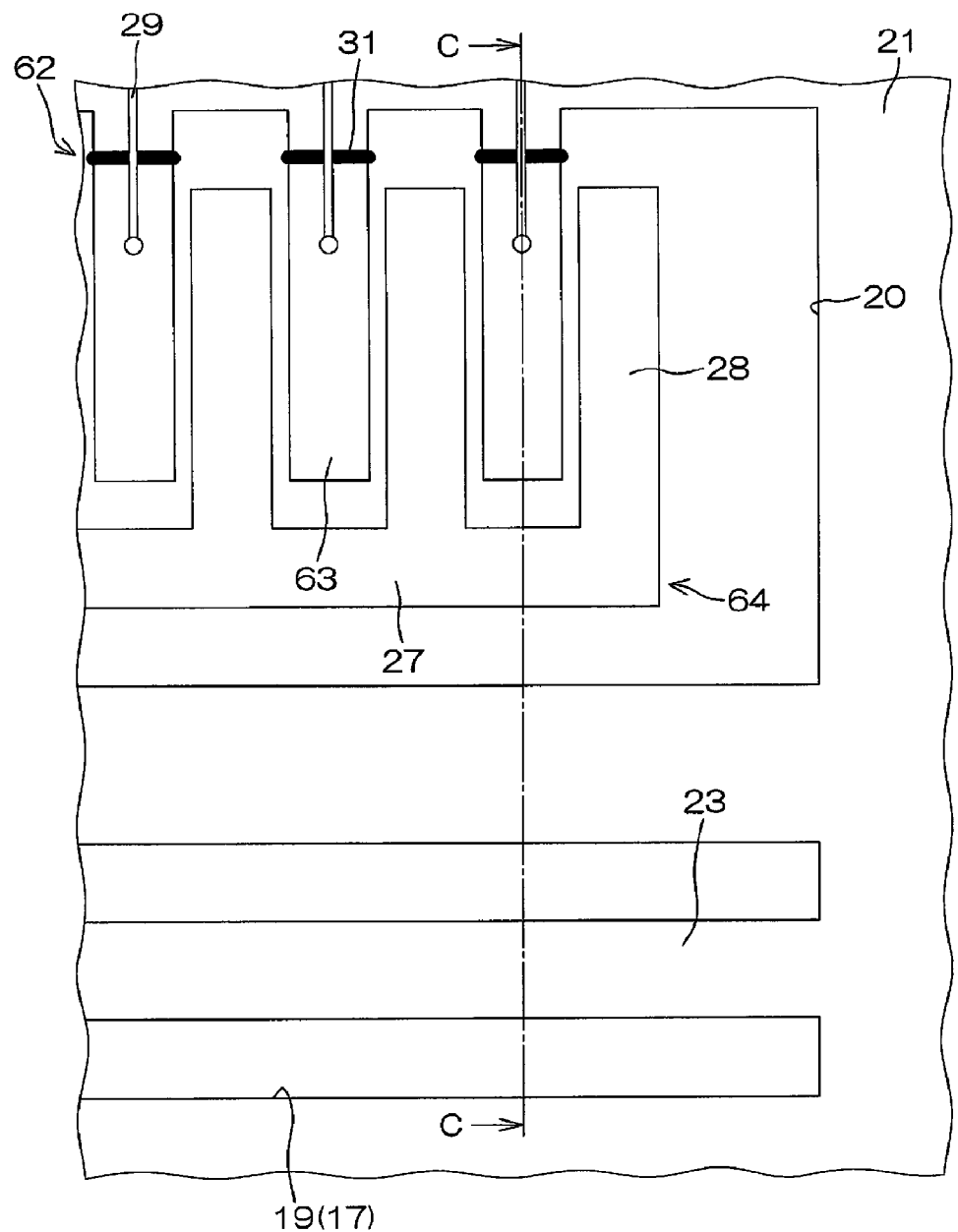
FIG. 7 is an enlarged view showing a major portion of the MEMS mirror device shown in FIG. 6 (the portion surrounded by a broken line in FIG. 6).
Figure 8:
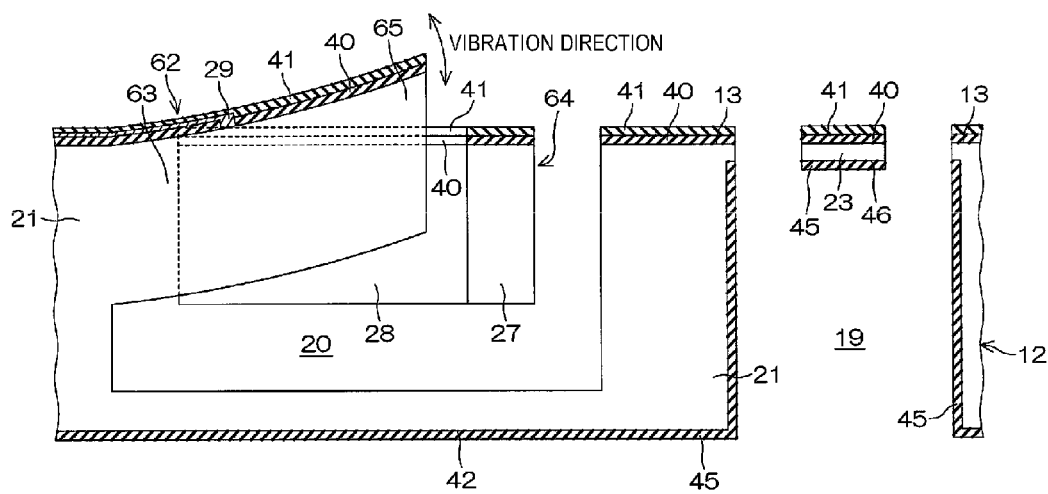
FIG. 8 is a section view of the MEMS mirror device shown in FIG. 6, showing the cross section taken along section line C-C in FIG. 7.

FIG. 6 is a schematic plan view showing a MEMS mirror device 61 according to a second embodiment of the present disclosure. FIG. 7 is an enlarged view showing a major portion of the MEMS mirror device 61 shown in FIG. 6 (the portion surrounded by a broken line in FIG. 6). FIG. 8 is a section view of the MEMS mirror device 61 shown in FIG. 6, showing the cross section taken along section line C-C in FIG. 7. In FIGS. 6 through 8, the portions corresponding to the respective portions shown in FIGS. 2 through 4B are designated by the same reference numerals as attached to the respective portions shown in FIGS. 2 through 4B. Therefore, in the interest of brevity, portions designated by the same reference numerals are not described again.

While the horizontal-drive-type MEMS mirror device 9 has been described in the foregoing embodiment, the present disclosure may be applied to a vertical-drive-type MEMS mirror device 61 in which the comb-teeth-like movable electrodes vibrates in the vertical direction intersecting the front surface 13 of the semiconductor substrate 12. In this case, unlike the horizontal-drive-type MEMS mirror device 9, the combined force applied to each of the movable electrodes 25 along the drive direction (the thickness direction of the semiconductor substrate 12) does not become zero even if each of the teeth of the fixed electrodes is kept at the same electric potential (even if each of the teeth of the fixed electrodes is not divided into two parts).

In the MEMS mirror device 61, as shown in FIG. 7, each of the teeth 63 of the fixed electrodes 62 is not formed into a ladder-like shape in a plan view but is formed into a rectangular shape in a plan view. As in the first embodiment, the first isolated insulation film 31 is embedded into the base end portion of each of the teeth 63 of the fixed electrodes 62 having the rectangular shape in a plan view. Similarly, the movable electrodes 64 as one example of vertical-type movable electrodes are formed into a rectangular shape in a plan view.

Only the first wiring lines 29 are formed as the wiring lines for applying a voltage to the fixed electrodes 62. The electrode pads 14 correspond to the first wiring lines 29 and the electrode pads 16 serve as ground wiring lines. As shown in FIG. 8, the fixed electrodes 62 are warped away from the electrode cavities 20 of the semiconductor substrate 12 into an arc-like shape in a section view so as to protrude out from the front surfaces of the movable electrodes 64 (the front surface 13 of the semiconductor substrate 12). Each of the fixed electrodes 62 includes a portion 65 protruding upward from the front surface 13 of the semiconductor substrate 12. In order to warp the fixed electrodes 62, for example, the portions of the interlayer insulation film 40 existing above the fixed electrodes 62 may be formed thicker than the remaining portion. As a consequence, stresses acting toward the frame portion 21 can be applied to the fixed electrodes 62. This makes it possible to warp the fixed electrodes 62.

The vertical-drive-type MEMS mirror device 61 is operated by repeatedly applying a positive voltage (of, e.g., from 50 V to 300 V) or a negative voltage (of, e.g., from −50 V to −300 V) in an alternating manner to the fixed electrodes 62 through the first wiring lines 29 by means of the drive IC 10 in a state that the movable electrodes 64 are fixed at the substrate electric potential. This makes it possible to alternately generate a Coulomb attraction force and a Coulomb repulsion force between the fixed electrodes 62 and the movable electrodes 64 in the vertical direction extending along the thickness direction of the semiconductor substrate 12. As a result, it becomes possible to, like a pendulum, vibrate the comb-teeth-like movable electrodes 64 upward and downward with respect to the comb-teeth-like fixed electrodes 62 using the fixed electrodes 62 as vibration centers (see FIG. 8).

Since the vibration is transferred to the swing portion 22 connected to the arm portions 27 of the movable electrodes 64, the swing portion 22 vibrates in the same vibration phase and period as those of the movable electrodes 64. As a consequence, the mirror 8 supported by the swing portion 22 can swing about the beams 23 as a swing axis. This makes it possible to turn the MEMS mirror device 61 on as shown in FIG. 1, whereby the laser beams combined by the RGB combiner 6 can be reflected at a specified angle.

As described above, the vertical-drive-type MEMS mirror device 61 can provide the same effects as provided by the horizontal-drive-type MEMS mirror device 9. In the vertical-drive-type MEMS mirror device 61, the vertical vibration of the movable electrodes 64 directly cause the mirror 8 to swing. Therefore, as compared with the horizontal-drive-type MEMS mirror device 9 in which the mirror 8 indirectly swings responsive to the resonance of the mirror 8, it is possible to sufficiently swing the mirror 8 even if the extent of the motion of the movable electrodes 64 is narrow. As a result, it is possible to reduce the voltage for driving the movable electrodes 64 to, e.g., about 30 V to 150 V.

By warping the fixed electrodes 62 upward, a specified gap extending along the thickness direction of the semiconductor substrate 12 can be left between the movable electrodes 64 and the fixed electrodes 62. It is therefore possible to generate a Coulomb attraction force and a Coulomb repulsion force having a component greater than zero in the vertical direction (the drive direction). Accordingly, the movable electrodes 64 can be easily driven by a small drive voltage.

Figure 9:
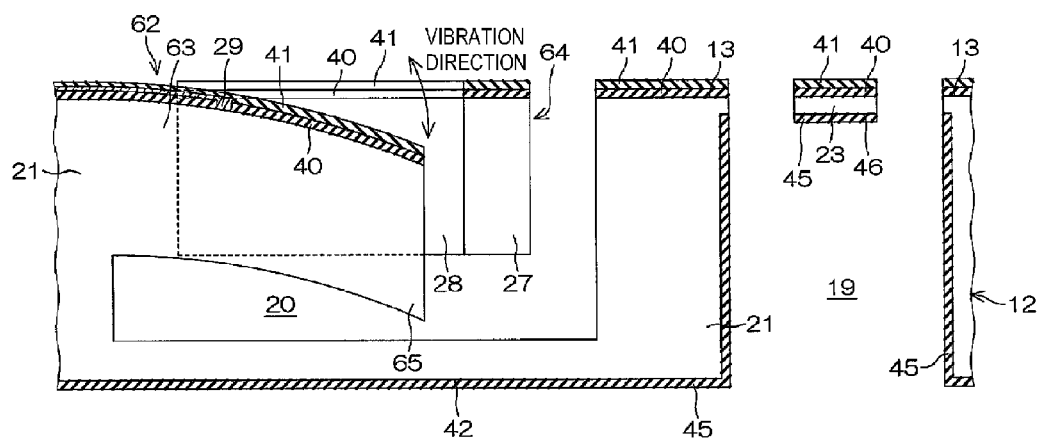
FIG. 9 is a view showing a modified example of the fixed electrode shown in FIG. 8.

In order to leave the specified gap in the thickness direction of the semiconductor substrate 12 between the movable electrodes 64 and the fixed electrodes 62, the fixed electrodes 62 may be warped toward the electrode cavities 20 of the semiconductor substrate 12 so as to protrude out from the rear surfaces of the movable electrodes 64 as shown in FIG. 9, instead of warping the fixed electrodes 62 upward. Alternatively, the movable electrodes 64 in place of the fixed electrodes 62 may be warped upward or downward to have the shape of the fixed electrodes 62 shown in FIGS. 8 and 9. It may also be possible to warp both the fixed electrodes 62 and the movable electrodes 64.

While certain embodiments of the present disclosure have been described above, the present disclosure can be embodied in many other forms. For example, the movable electrodes 25 and 64 may be insulated from the frame portion 21 by embedding an insulation film like the first isolated insulation film 31 into the base end portion of each of the movable electrodes 25 and 64. In this case, electrode pads (wiring lines) for applying a voltage to the movable electrodes 25 and 64 may be further provided in addition to the electrode pads 16 serving as ground wiring lines.

The material of the first isolated insulation film 31 and the second isolated insulation films 34 is not limited to silicon oxide ($SiO_2$) but may be other materials having a dielectric property. In addition, many different changes in design can be made without departing from the scope of the present disclosure defined in the claims.

While certain embodiments have been described, these embodiments have been presented by way of example only, and are not intended to limit the scope of the disclosures. Indeed, the novel devices and methods described herein may be embodied in a variety of other forms; furthermore, various omissions, combinations, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A micro-electro-mechanical system (MEMS) mirror device, comprising:
    a semiconductor substrate having a first cavity with an open bottom and a second cavity with a closed bottom which are selectively formed to communicate with each other, the semiconductor substrate including a frame portion arranged to define the first cavity and the second cavity at lateral sides of the first cavity and the second cavity; and
    a mirror provided on the semiconductor substrate,
    the semiconductor substrate including: a swing portion formed just above the first cavity in a spaced-apart relationship with the frame portion to support the mirror from below; a straight beam provided just above the first cavity to extend between the frame portion and the swing portion, the beam arranged to support the swing portion at a lateral side of the swing portion such that the swing portion is kept floating in the first cavity; a comb-teeth-like fixed electrode arranged just above the second cavity and fixed to the frame portion; and a comb-teeth-like movable electrode formed to extend over the first cavity and the second cavity, the movable electrode connected to the swing portion just above the first cavity, the movable electrode meshing with the fixed electrode just above the second cavity with a gap left between the movable electrode and the fixed electrode, the swing portion configured to swing about the beam as a swing axis in response to movement of the movable electrode.

2. The device of claim 1, further comprising:
    a rear surface insulation film formed on a rear surface of the swing portion.

3. The device of claim 1, further comprising:
    an isolated insulation film embedded into at least one of the fixed electrode and the movable electrode and configured to insulate a portion of at least one of the fixed electrode and the movable electrode from the remaining portion of the semiconductor substrate.

4. The device of claim 1, further comprising a wiring line formed in the same layer as the mirror and configured to apply a voltage to at least one of the fixed electrode and the movable electrode.

5. The device of claim 1, wherein the movable electrode includes a horizontal-type movable electrode configured to alternately displace along a front surface of the semiconductor substrate toward or away from the fixed electrode adjoining to the movable electrode.

6. The device of claim 1, wherein the movable electrode includes a vertical-type movable electrode configured to alternately displace toward or away from the second cavity in a direction intersecting a front surface of the semiconductor substrate.

7. The device of claim 6, wherein the vertical-type movable electrode is warped away from the second cavity to protrude out from a front surface of the fixed electrode or warped toward a rear surface of the semiconductor substrate to protrude out from a rear surface of the fixed electrode.

8. The device of claim 6, wherein the fixed electrode is warped away from the second cavity to protrude out from a front surface of the vertical-type movable electrode or warped toward a rear surface of the semiconductor substrate to protrude out from a rear surface of the vertical-type movable electrode.

9. The device of claim 1, wherein the semiconductor substrate is an electrically conductive silicon substrate.

10. A micro-electro-mechanical system (MEMS) mirror module, comprising:
the MEMS mirror device of claim 1; and
a driver configured to drive the MEMS mirror device.

11. A method for manufacturing a micro-electro-mechanical system (MEMS) mirror device, comprising the steps of:
preparing a semiconductor substrate;
selectively forming a first cavity opened at the side of a rear surface of a semiconductor substrate by selectively etching the rear surface of the semiconductor substrate;
forming a surface layer portion of the semiconductor substrate at the side of a front surface of the semiconductor substrate with respect to the first cavity and forming a frame portion configured to define the first cavity at a lateral side of the first cavity;
forming a stopper insulation film on a rear surface of the surface layer portion of the semiconductor substrate;
forming a mirror on a front surface of the surface layer portion of the semiconductor substrate;
selectively etching the surface layer portion of the semiconductor substrate from the front surface of the semiconductor substrate to the stopper insulation film and forming a swing portion configured to support the mirror from below, by using the remaining surface layer portion, in a spaced-apart relationship with the frame portion;
selectively etching the surface layer portion of the semiconductor substrate from the front surface of the semiconductor substrate to the stopper insulation film and forming a straight beam configured to support the swing portion from a lateral side of the swing portion, by using the remaining surface layer portion, to extend between the frame portion and the swing portion;
forming an electrode trench by selectively etching the frame portion from the front surface of the semiconductor substrate to a thickness-wise intermediate portion of the semiconductor substrate, and forming a comb-teeth-like fixed electrode and a comb-teeth-like movable electrode meshing with and opposing each other across the electrode trench;
forming a second cavity just below the fixed electrode and the movable electrode by isotropic etching in which an etching medium is supplied to the electrode trench, the second cavity continuously extending below the fixed electrode and the movable electrode and leading to the first cavity; and
after forming the second cavity, selectively removing a portion of the stopper insulation film protruding out from the swing portion and the beam such that the swing portion and the beam are kept floating just above the first cavity.

12. The method of claim 11, wherein at least two of the steps of forming the swing portion, the step of forming the beam and the step of forming the fixed electrode and the movable electrode are performed at the same time.

13. The method of claim 11, further comprising the steps of:
prior to forming the electrode trench, forming an isolating trench in the semiconductor substrate by selectively etching the semiconductor substrate from the front surface thereof; and
forming an isolated insulation film within the isolating trench by embedding an insulation material into the isolating trench,
the step of forming the electrode trench comprising a step of etching the semiconductor substrate such that a portion of the fixed electrode and the movable electrode is selectively insulated from the semiconductor substrate by the isolated insulation film.

14. The method of claim 11, further comprising the step of:
forming a wiring line for applying a voltage to at least one of the fixed electrode and the movable electrode, the step of forming the wiring line being performed simultaneously with the step of forming the mirror.

15. The method of claim 11, wherein the step of forming the second cavity comprises: forming a protective film on side walls of the fixed electrode and the movable electrode; selectively removing the protective film from a bottom surface of the electrode trench; and, after removing the protective film, forming the second cavity by digging the electrode trench through anisotropic etching and then removing lower portions of the fixed electrode and the movable electrode through isotropic etching.

* * * * *